(12) United States Patent
Namba

(10) Patent No.: US 7,904,392 B2
(45) Date of Patent: Mar. 8, 2011

(54) CONTENT USAGE RULE MANAGEMENT SYSTEM

(75) Inventor: Takaaki Namba, Nisshin (JP)

(73) Assignee: Panasonic Corporation, Osaka (JP)

( * ) Notice: Subject to any disclaimer, the term of this patent is extended or adjusted under 35 U.S.C. 154(b) by 1797 days.

(21) Appl. No.: 10/278,816

(22) Filed: Oct. 24, 2002

(65) Prior Publication Data
US 2003/0083954 A1 May 1, 2003

(30) Foreign Application Priority Data

Oct. 25, 2001 (JP) ................................. 2001-327357

(51) Int. Cl.
*G06F 11/14* (2006.01)
*G06F 15/173* (2006.01)
(52) U.S. Cl. .............. 705/58; 726/29; 370/254; 709/223
(58) Field of Classification Search .................... 705/50; 713/168; 455/426, 414; 725/24
See application file for complete search history.

(56) References Cited

U.S. PATENT DOCUMENTS

| | | | | |
|---|---|---|---|---|
| 5,721,583 | A * | 2/1998 | Harada et al. | 725/24 |
| 6,609,199 | B1 * | 8/2003 | DeTreville | 713/172 |
| 6,697,944 | B1 * | 2/2004 | Jones et al. | 713/168 |
| 6,965,770 | B2 * | 11/2005 | Walsh et al. | 455/426.1 |
| 6,990,580 | B2 * | 1/2006 | Go et al. | 713/168 |
| 7,069,451 | B1 * | 6/2006 | Ginter et al. | 705/51 |
| 7,073,063 | B2 * | 7/2006 | Peinado | 713/171 |
| 7,080,037 | B2 * | 7/2006 | Burger et al. | 705/50 |
| 7,272,859 | B2 * | 9/2007 | Kuriya et al. | 726/29 |
| 2002/0137496 | A1 * | 9/2002 | Nagaoka et al. | 455/414 |

FOREIGN PATENT DOCUMENTS

| | | |
|---|---|---|
| CN | 1386333 | 12/2002 |
| DE | 44 24 380 | 1/1996 |
| EP | 1 213 842 | 6/2002 |
| JP | 11-149709 | 6/1999 |
| JP | 2001-148156 | 5/2001 |
| JP | 2002-51377 | 2/2002 |
| JP | 2002-185631 | 6/2002 |
| WO | 01/48715 | 7/2001 |
| WO | 02/21835 | 3/2002 |
| WO | 02/086725 | 10/2002 |

OTHER PUBLICATIONS

Kentaro Fujimoto; Journal "PC Style 21", vol. 1, No. 8, p. 10, title *"Kongetsu no Keyword -Bluetooth"*; published by Mainchi Communications Inc. on Jul. 18, 2000.

* cited by examiner

*Primary Examiner* — Evens J Augustin
(74) *Attorney, Agent, or Firm* — Wenderoth, Lind & Ponack, L.L.P.

(57) ABSTRACT

A content user terminal including a utilization unit that provides a content utilization, and an interface unit 137 that inquires the content utilization availability to the portable content usage rule management device via a wireless communication and obtains a content utilization permission data which is a inquiry result via a wireless communication. The utilization unit provides the content utilization based on the obtained content utilization permission data. The portable content usage rule management device includes a copyright data storage management unit that stores and manages the content usage rule, an interface unit that receives the inquiry result of the content utilization availability from the content user terminal via a wireless communication, and a copyright data processing is unit that responds to the received inquiry result, judges the content utilization availability based on the stored content usage rule and creates a content utilization permission data based on the judge result. The interface unit sends the created content utilization permission data to the content user terminal via a wireless communication.

10 Claims, 22 Drawing Sheets

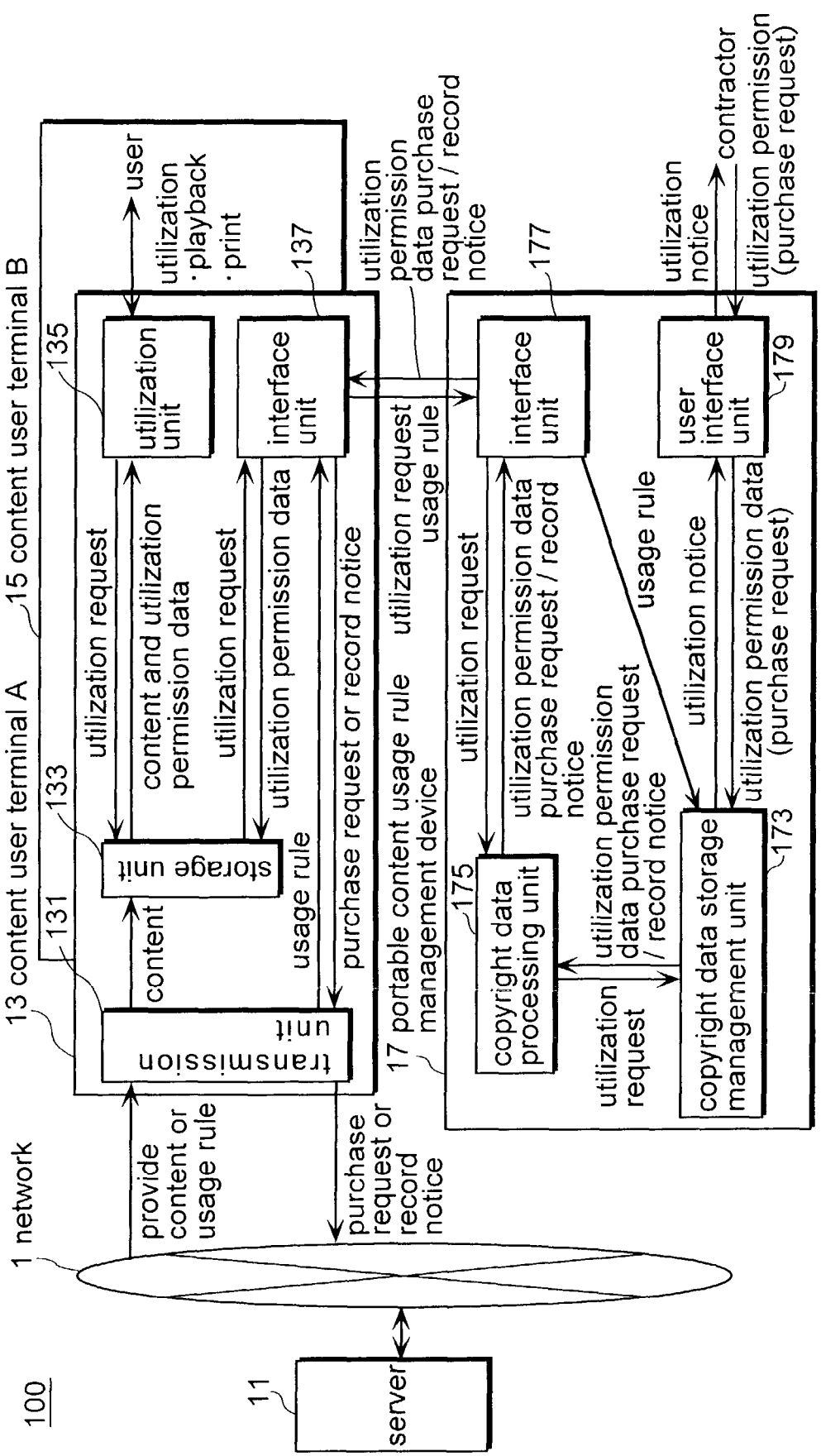

Fig. 16

| type | | parameter name | size (Byte) | description |
|---|---|---|---|---|
| header | unencrypted unit | version | 2 | Usage rule extention/improvement model for time ahead. High 1 bite; measure (change format)/Low 1bite; manner (add descriptor). |
| | | length | 4 | All over length for usage rule encryption unit. Recognition for encryption/decode object size. |
| | | control mode | 1 | Control mode for usage rule. Corresponds to a plurality of copyright management mechanisms. |
| | | encryption type | 1 | Encryption type for payload of usage rule (unencrypted=0, encrypted 1~255). Judgment for encryption type. |
| | | expiration date | 5 | Expiration date for usage rule (relative period, or absolute time). Month/day/h/min/sec. "BCD +MJD" After passed "purchased time + storage time" or "absolute time", usage rule is discarded. Storage time limit management for usage rule. |
| | | content ID | 64 | A unique identifier for specifying a usage rule. |
| payload | encrypted unit | usage rule ID | 16 | A unique identifier for specifying a usage rule (random unit function is as well equipped on an encryption occasion). Available for preventing an illegal copy. |
| | | descriptor unit | N | A plurality of setups is available for descriptor form (variable length). ·Content key descriptor (includes content encryption type). ·Preview key descriptor (include a preview encryption type). ·A descriptor for a content in each various right. |
| trailer | | tamper detection | 20 | Detects tamper. Object range is header + payload. SHA-1 etc. |

Fig. 17 content key descriptor

| descriptor format | parameter name | size (Byte) | description |
|---|---|---|---|
| base unit | descriptor No. | 1 | Type of descriptor. 0=content key descriptor |
| | descriptor length | 2 | Length for descriptor (0-65535) Calculate content key length. |
| | content encryption type | 1 | Encryption type of content. (unencrypted=0, encrypted=1-255) |
| | content key | M | Decoding key for content encryption. (utilization permission). Variable length. |

Fig. 18 preview key descriptor

| descriptor format | parameter name | size (Byte) | description |
|---|---|---|---|
| base unit | descriptor No. | 1 | Type of descriptor. 1=preview key descriptor |
| | descriptor length | 2 | Length for descriptor (0-65535). Calculate preview key length. |
| | content encryption type | 1 | Encryption type of preview content. (unencrypted=0, encrypted=1-255) |
| | content key | M | Encryption key for preview content (utilization permission). Variable length. |

Fig. 19

Descriptor for various right system

| descriptor format | parameter name | size (Byte) | description |
|---|---|---|---|
| base unit | descriptor No. | 1 | Descriptor type.<br>2=playback right descriptor<br>3=move right descriptor<br>4=copy right descriptor<br>5=print right descriptor<br>6=modify right descriptor<br>7-255=reserve |
| | descriptor length | 2 | Length of descriptor (0-65535) |
| | right permission | 4 | Specify a number of times=0x0~0xFFFFFFFE (4,294,967,294 times)<br>Free=0xFFFFFFFF |
| | access right | 1 | 0x00=not shared (only accessible for contractor)<br>0x01=group sharable (family only)<br>0x02-0xFE=Reserve<br>0xFF=shared (no limitation) |
| option unit | quality imitation (only playback right, copy right, print right) | 1 | Specify quality<br>Monotone(gray scale), color (standard, high definition), etc. |

Fig. 21

| type | | parameter name | size (Byte) | description |
|---|---|---|---|---|
| header | unencrypted unit | version | 1 | Telegraphic message between content user terminal and portable terminal for extended/improvement model for time ahead (0-255). |
| | | length | 4 | All over length for encryption unit. Recognition for encryption/decode object size (variable length). |
| | | destination address | 16 | Destination ID or destination address. Default is broadcast. |
| | | sender address | 16 | Own ID or own address. |
| | | telegraphic message ID | 2 | Utilization request, utilization permission data notice, usage rule distribution, backup request/response, restore request/response, usage rule confirmation notice, utilization record notice, etc. |
| | | sequence No. | 2 | Numbers in order. Transmittable for telegraphic message separately. |
| | | encryption type | 1 | Encryption type for telegraphic message encryption unit(unencrypted =0, encrypted 1~255). Judgment for encryption type (encryption after checksum calculation. checksum confirmation after decoding ) |
| payload | encrypted unit | content ID | 64 | A unique identifier for specifying a usage rule. |
| | | data for each telegraphic message | N (variable) | Usage rule, utilization permission data, backup destination address, restore destination address, error code, utilization record, etc. |
| trailer | | checksum | 4 | CRC, etc. Error detection/correction. |

CONTENT USAGE RULE MANAGEMENT SYSTEM

BACKGROUND OF THE INVENTION (1) Field of the Invention

The present invention relates to a copyright data management system, and more particularly to a content usage rule management system that conducts a management processing of a digital copyright and a usage rule when using a content.

(2) Description of the Related Art

In the conventional copyright management system, an IC card, secured and inserted into a content user terminal, is used for managing a copyright data and conducting a content usage management processing. When a user wants to utilize a content, with another user terminal besides the terminal that is operating at the moment, using a pre-holding content usage rule (data which indicates a scope of the right for the content usage right quantitatively, that how much content can we utilize under what kind of circumstances), that is, when a user wants to carry around his own content usage rule, the user should make a good preparation for the own content usage rule to be written to an IC card anytime. And the portability for the content usage rule is secured by inserting the IC card, in which the content usage rule is always being written, to the other user terminal, and the content can be utilized.

As an example of conducting a management with the IC card, there is a conditional receiving method for a digital broadcasting system such as a "pay broadcasting recoding reproduction method" (Japanese Patent No. 2983504). FIG. 1 is a diagram that shows a conventional content usage management system configuration. The content usage management system includes a wide area network 1, a broadcast (communication) satellite 2, a user terminal A3 such as an STB (Set Top Box), a user terminal B5, an IC card A7, an IC card B9, a server 11, a TV 130 and a TV 150. In the figure, the wide area network 1 shall include a broadcast communication network such as a satellite TV broadcasting (communication). Conventionally, the user terminal A3 is equipped with the IC card A7, the user terminal B5 is equipped with the IC card B9 as shown in the system configuration diagram of FIG. 1. The user terminal A3 and B5, which have a communication function, receive a content from the server 11 via the broadcast (communication) satellite 2 and store the received content inside. On the other hand, the user terminal A3 and B5 each obtains a content usage rule via the wide area network 1 such as a dial line network and each user terminal conducts a copyright management in each IC card. The TV 130 connected to the user terminal A3 and the TV 150 connected to the user terminal B5 are available for its utilization by each IC card.

However, with the above conventional method, the portable service for the IC card is not effectively used because of a lack of convenience for inserting/pulling of the IC card and a lack of the portability. As a result, the IC card is used under a condition of always-inserted into the content user terminal, thus the portable service is not realized with the above method.

Also, when a contractor of the IC card and a content user are different, for example, a "family plan use" contract, it is possible to use a content whoever operates the user terminal despite of the contractor's intent with the IC card inserted. Thus, it is difficult for the contractor to give a permission to utilize a content only to a user who is permitted by the contractor.

On the other hand, when one content user terminal is used by a plurality of contractors, each contractor needs to use the content user terminal by turns after inserting the IC card. As a result, when the content user terminal is used for a parallel processing for contents utilization, the processing should be operated by turns as is the same case with the above, accordingly, a problem, which a number of contractors can not use the same content user terminal at the same time, will occur.

SUMMARY OF THE INVENTION

Accordingly, the object of the present invention is to provide a content usage rule management system which is a system to give a utilization permission by contractors while securing the portability of the content usage rule without reducing its convenience, and to use a content user terminal by a plurality of contractors in parallel.

In order to solve the above problem, the content usage rule management system according to the present invention comprises a user terminal that provides a content utilization for users and a content usage rule management device that stores a content usage rule for permitting a content utilization with the user terminal and manages the content utilization. And the above mentioned user terminal includes a utilization unit having a playback device and a user interface for providing a desired content utilization to users and an inquiry unit operable to inquire a content utilization availability of the utilization unit to the content usage rule management device via a wireless communication and obtain a content utilization permission data, which is a result of the inquiry, from the content usage rule management device via a wireless communication. And the above mentioned utilization unit provides the content utilization based on the obtained content utilization permission data, and above mentioned content usage rule management device, which is a portable device includes a copyright data storage management unit that stores and manages the content usage rule an inquiry result receiving unit that receives an inquiry result of a content utilization availability from the user terminal via a wireless communication, a copyright data processing unit operable to judge an availability for the content in the user terminal and creates a content utilization permission data based on a judge result and a permission unit operable to send the created content utilization permission data to the user terminal via a wireless communication.

As a result, according to the content usage rule management system of the present invention, it is unnecessary to mount a copyright management function to a user terminal. The content usage management device can manage the content usage rule in the user terminal with securing the content usage rule portability by communicating with the user terminal via a wireless communication.

Also, the above mentioned user terminal in the content usage rule management system according to the present invention includes, a plurality of the utilization units that provides a content utilization to a plurality of users in parallel. And the above inquiry unit inquires the content utilization availability to a plurality of the content usage rule management devices and obtains a plurality of the content utilization permission data, and the above each utilization unit provides the content utilization in parallel based on the plurality of the content utilization permission data received from the plurality of the content usage rule management devices.

As a result, according to the content usage rule management system of the present invention, one content user terminal can be used by a plurality of contractors in parallel.

Also, the above content usage rule management system in the content usage rule management system according to the present invention further includes a user interface unit that notifies to a contractor of the content usage rule management device that a content is available upon receipt of the content usage rule from the user terminal.

As a result, according to the content usage rule management system of the present invention, there is an advantage that it is possible to obtain a contractor's permission although a content user and a contractor of the content usage rule management device are different person.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is a block diagram that shows a content usage rule management system configuration according to the first embodiment.

FIG. 16 a diagram that shows an example of a data format for the usage rule.

FIG. 17 is a diagram that shows an example of a data format of a content key descriptor for the usage rule of FIG. 16.

FIG. 18 is a diagram that shows an example of a data format of the preview key descriptor for the usage rule of FIG. 16.

FIG. 19 is a diagram that shows an example of a data format of a right data descriptor for the usage rule shown in FIG. 16. Fig.

FIG. 21 is a diagram that shows an example of a data format for communication data between the content user terminal and the portable content usage rule management device.

DESCRIPTION OF THE PREFERRED EMBODIMENT(S)

The First Embodiment

Figure 1:
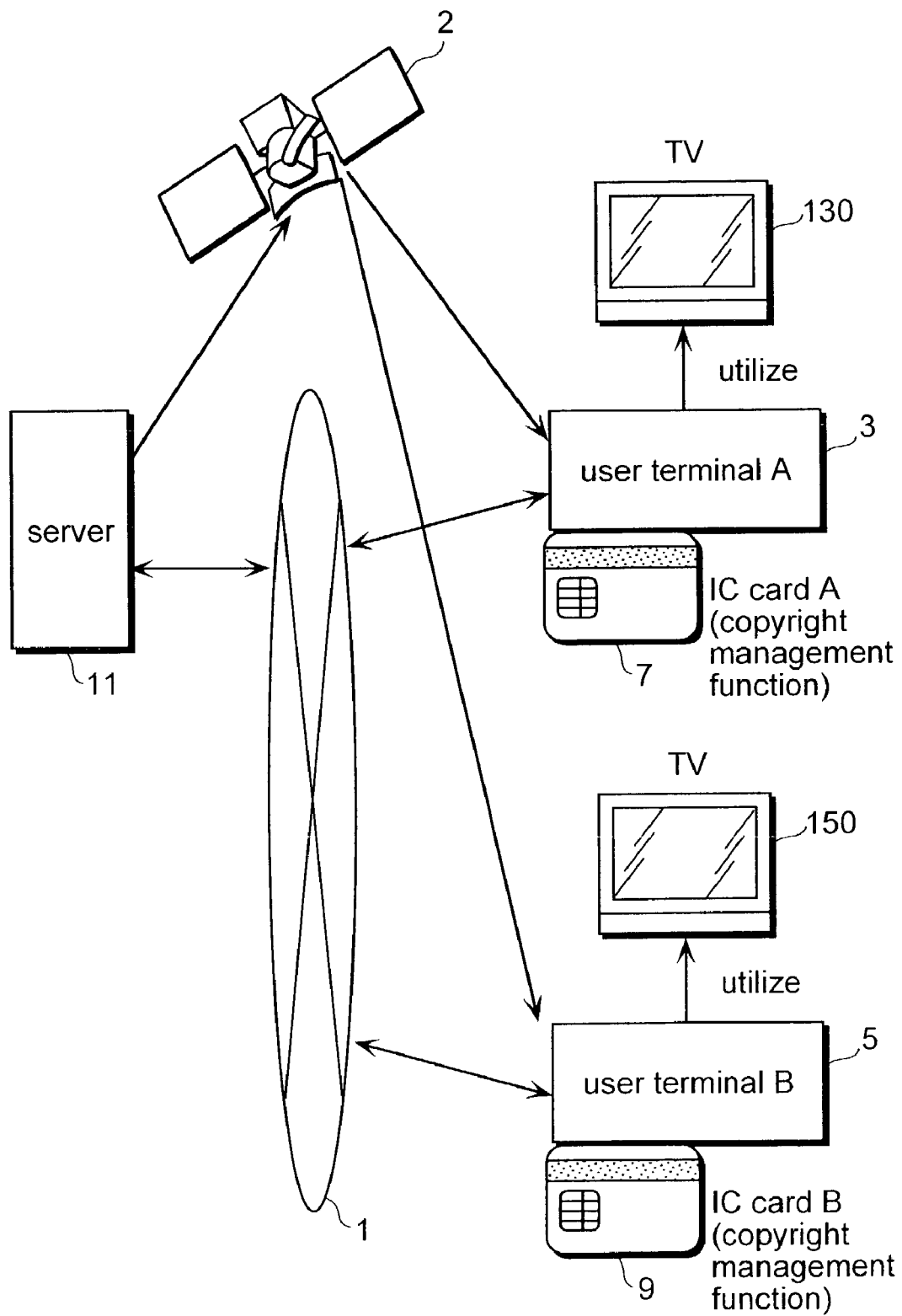
FIG. 1 is a diagram that shows a conventional content utilization management system configuration.

FIG. 2 is a block diagram that shows a configuration of a content usage rule management system according to the first embodiment of the present invention. The content usage rule management system 100 is a system which the portable device such as a portable phone device holds a content usage rule, called a "license ticket" that is able to give a content utilization to the user terminal, and includes a server 11, a content user terminal A13, a content user terminal B15, a portable content usage rule management device A17 and a wide area network 1. The server 11 conducts a central control of a content utilization right purchased by a user, and provides the content and the content usage rule to each content user terminal in response to a content utilization request and a purchase request from each content user terminal. In other words, the server 11 provides the content requested from a content user terminal A13 and a content user terminal B15 via the wide area network 1 to the content user terminal A13 and the content user terminal B15, and provides the content usage rule (the license ticket) for the requested utilization (or the purchased right) to the content user terminal A13 and the content user terminal B15 in response to the content utilization request and the purchase request from the content user terminal A13 and the content user terminal B15. The content usage rule management system is realized as a server 1 which corresponds to a BS/CS digital broadcast station, realized as a server device controlled by an Internet broadcast station and a copyright data management organization, a content user terminal A13 and a content user terminal B15 which correspond to a receiver, for example an STB, realized as a terminal device that is installed in home personal computers and convenience stores, and realized as a portable content usage rule management device which corresponds to a portable phone, a PHS and a PDA. The content user terminal A13 and the content user terminal B15 are connected to the portable content usage rule management device A17 with a wireless interface such as a Bluetooth™.

In addition, providing of a content usage rule is defined as for providing a condition which includes a utilization conditional data and a variety of necessary information for utilizing the content when a user (the most typical user is an original author and a content holder), who has a provide right, provides a content.

The content user terminal A13 is a terminal device for a user to utilize a content and has a transmission unit 131, a storage unit 133, a utilization unit 135 and an interface unit 137. The content user terminal B15 has the same configuration with the content user terminal A13. The transmission unit 131 transmits a purchase request, a record notice, a content and a content usage rule to the server 11 via the wide area network 1. The storage unit 133 is a hard disk or an IC card that supplies a memory area for storing a content received from the server 11 and a content utilization permission data received from the portable content usage rule management device A17. The utilization unit 135 is a user interface that conducts an input and output operation with a TV, a printer, a speaker, a controller and a remote controller for utilizing a content. The utilization unit 135 decodes an encryption of the content stored in the storage unit 133 using a content key in the content utilization permission data and provides a content utilization (includes a reproduction, a printout and/or a moving) in an amount of times that the permission is given from the content utilization permission data. The interface unit 137 includes a wireless interface that is for confirming the content utilization permission with the portable content usage rule management device A17.

The content user terminal A13 and the content user terminal B15 are user terminals that can utilize contents only after receiving a permission result, which is given based on the usage rule in the portable content usage rule management device A17, via the wireless communication with the portable content usage rule management device A17 (details are described later referring to a sequence diagram of FIG. 10 and a data format diagram of FIG. 19).

In addition, the content user terminal A13 and the content user terminal B15 actually should have other functions such as an authentication function for conducting a device authentication and a personal authentication, a tamper tolerance function for operating each function safely, and a variety of configuration elements for realizing a power control function, however, those are not thrust of the present invention, thus the explanation is omitted. The portable content usage rule management device A17 is a portable device that manages the content utilization in the content user terminal based on the content usage rule stored inside the device, and includes a copyright data storage management unit 173, a copyright data processing unit 175, an interface unit 177 and a user interface unit 179. The copyright data storage management unit 173 is a memory that supplies a memory part for storing and managing a content usage rule, a content title data and a copyright related data which includes an author data, a publisher data and thereof. The copyright data processing unit 175 conducts a content utilization management processing for the content user terminal A13 and the content user terminal B15 based on the content usage rule stored in the copyright data storage management unit 173. More specifically, this content utilization management is conducted using the content utilization permission data which indicates the content utilization availability. When the content utilization permission data indicates that the content utilization is permitted, a content key and a number (or time), that how many times the content can be utilized, are described. On the other hand, when the content utilization is not permitted, only data indicating that "the content utilization is not permitted" is described. The interface unit 177 is a wireless communication unit that receives the content usage rule and a utilization request from the content user terminal A13 and the content user terminal B15, and sends the content utilization permission data to the content user terminal A13 and the content user terminal B15. When the content user terminal A13 or the content user terminal B15 requests for a utilization request for the content usage rule stored in the copyright data storage management unit 173, the user interface unit 179 issues a notice of a utilization request received from the content user terminal A13 or the content user terminal B15 to the stored usage rule contractors, and confirms the content utilization permission with the content user terminal A13 and the content user terminal B15.

In addition, the portable content usage rule management device A17 actually should have other functions such as an application service function, an authentication function for conducting a device authentication and a personal authentication, a tamper tolerance function for operating each function'safely, and a variety of configuration elements for realizing a power control function, however, those are not thrust of the present invention, thus the explanation is omitted.

Figure 3A:
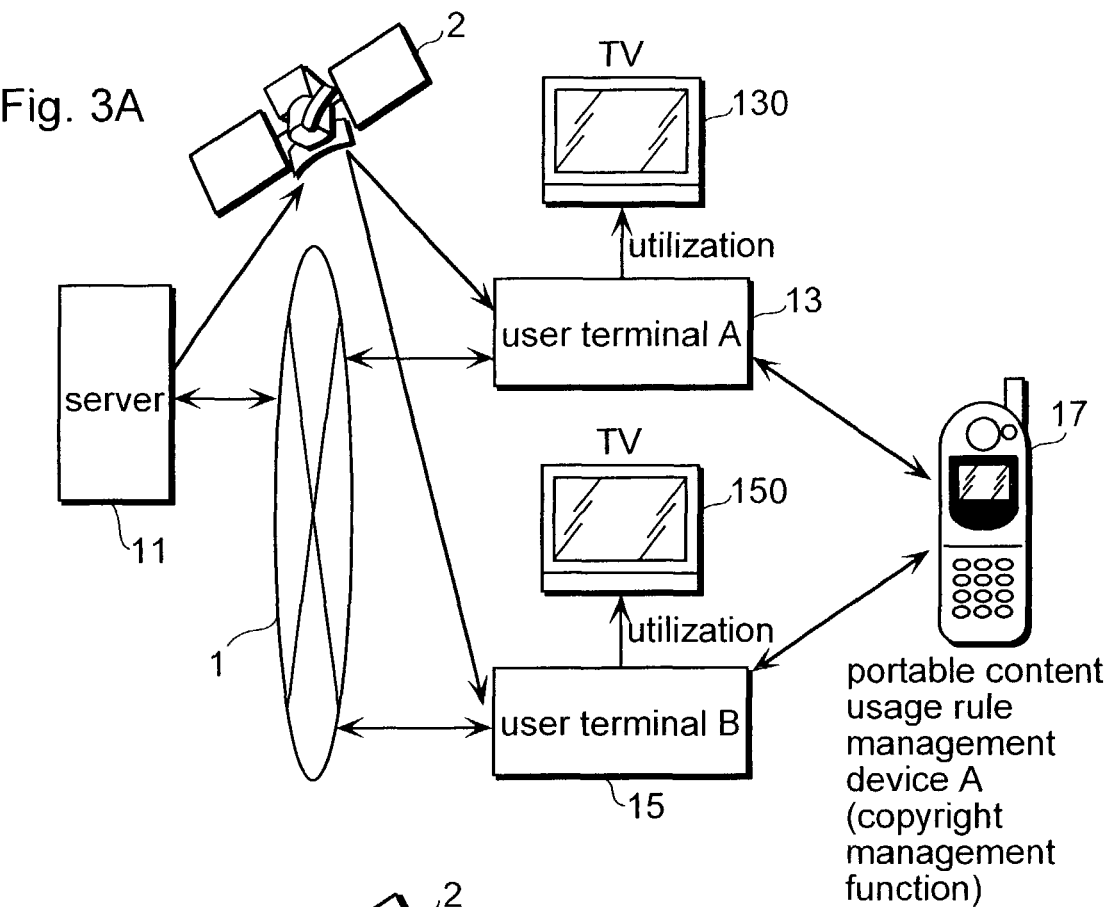
FIG. 3A is a diagram that shows a data flow in the content usage rule management system when the system is configured as the portable content usage rule management device A as shown in FIG. 2.
Figure 3B:
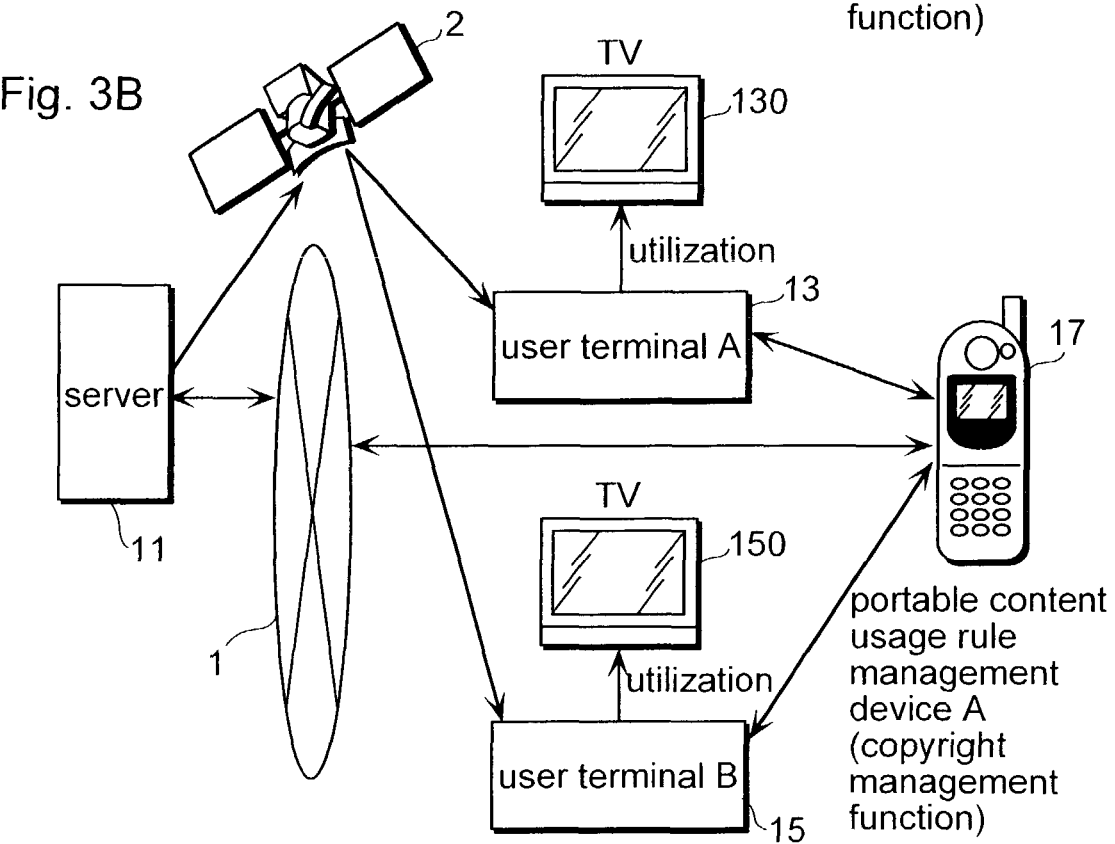
FIG. 3B is a diagram that shows a data flow in the content usage rule management system 100 when the data transmission function is configured in the portable content usage rule management device A with the server.

FIG. 3A is a diagram that shows a data flow in the content usage rule management system when the portable content usage rule management device A17 configured as shown in FIG. 2. FIG. 3B is a diagram that shows a data flow in the content usage rule management system 100 when the data transmission function is configured in the portable content usage rule management device A17 with the server 11. As shown in FIG. 3A, the portable content usage rule management device A17 does not receive the usage rule directly from the server 11 but receives the usage rule from each content user terminal via the content user terminal A13 or the content user terminal B15. Following is detailed explanation of each operation in the content usage rule management system 100 referring to FIG. 4, FIG. 5 and FIG. 6 when the case that the portable content usage rule management device A17 is configured as FIG. 2 and, FIG. 3A, and a content user and a contractor are the same person.

There are two ways for utilizing contents. One of them is to ① utilize a content by consuming the purchased usage rule, purchasing a usage rule every time or purchasing some usage rules for future use previously. And the other is to ② utilize a content by consuming the usage rule which is not yet purchased. To be more precisely, the server 11 provides an encrypted usage rule, which can be consumed only in devices that configure the content usage management system 100, with contents beforehand in a content distribution using a broadcast (i.e. viewing a charged broadcast). And the amount for utilizing the contents is calculated and is charged automatically every time users or contractors use the contents. The calculation for the amount that the contents are used is conducted with the purchase record notice. The purchase record notice is a data that notifies to the server 11 that which content has been utilized indeed for how much within its contracted utilization. The server 11 calculates the content charge in accordance with the purchase record notice received from the content user terminal or the portable content usage rule management device and conducts an accounting processing. In addition, this purchase record notice is not necessarily sent to the server 11 every time in its utilization. For example, the purchase record notice may well be stored in the content user terminal or the portable content usage rule management device in certain amount of periods, and after that, it is periodically sent to the server 11. Following is an explanation for the above-mentioned two ways ①, ② of the content utilization.

Figure 4:
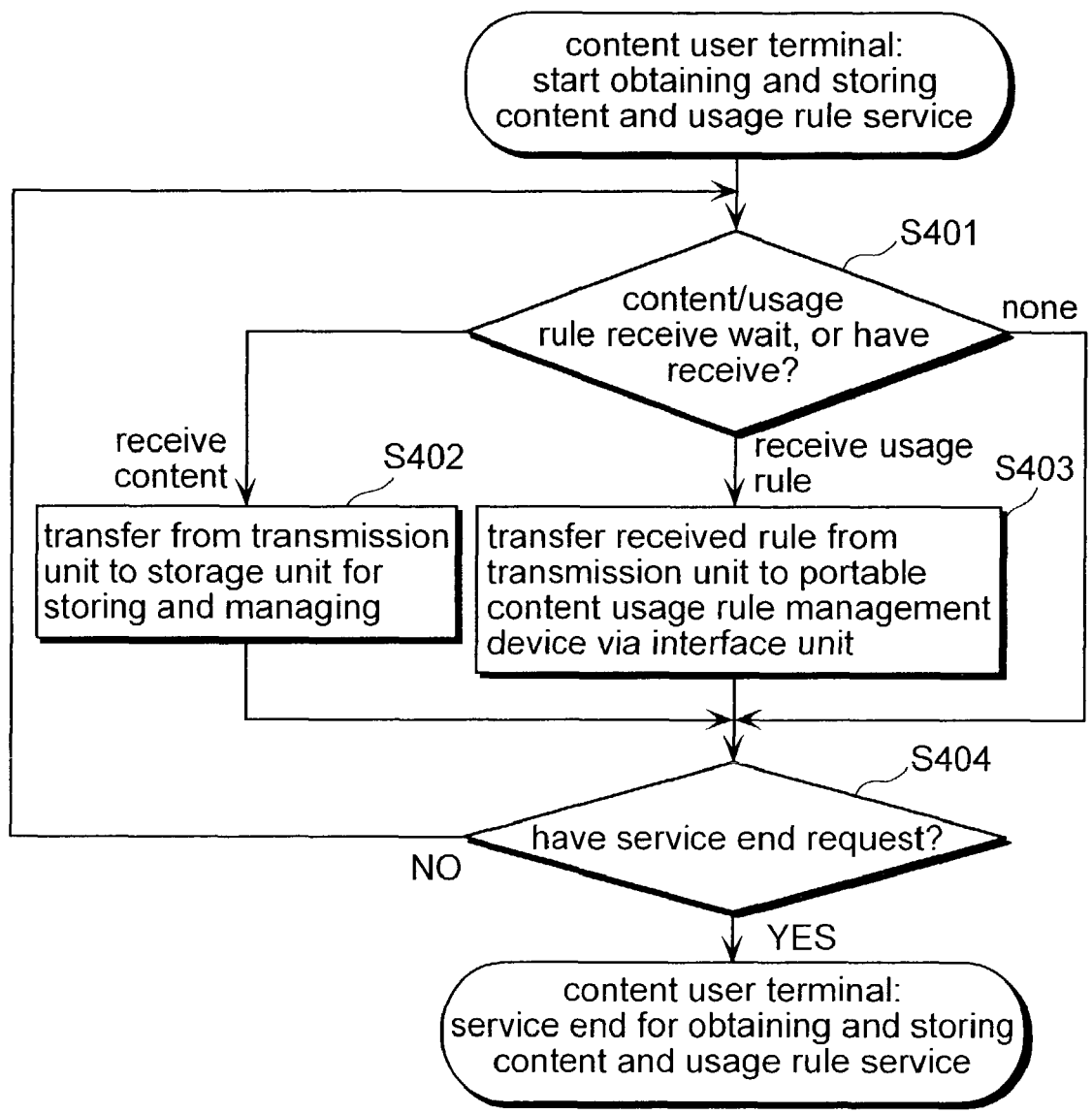
FIG. 4 is a flow chart that shows a processing procedure for obtaining and storing a content and a usage rule in the content user terminal A as shown in FIG. 2.
Figure 5:
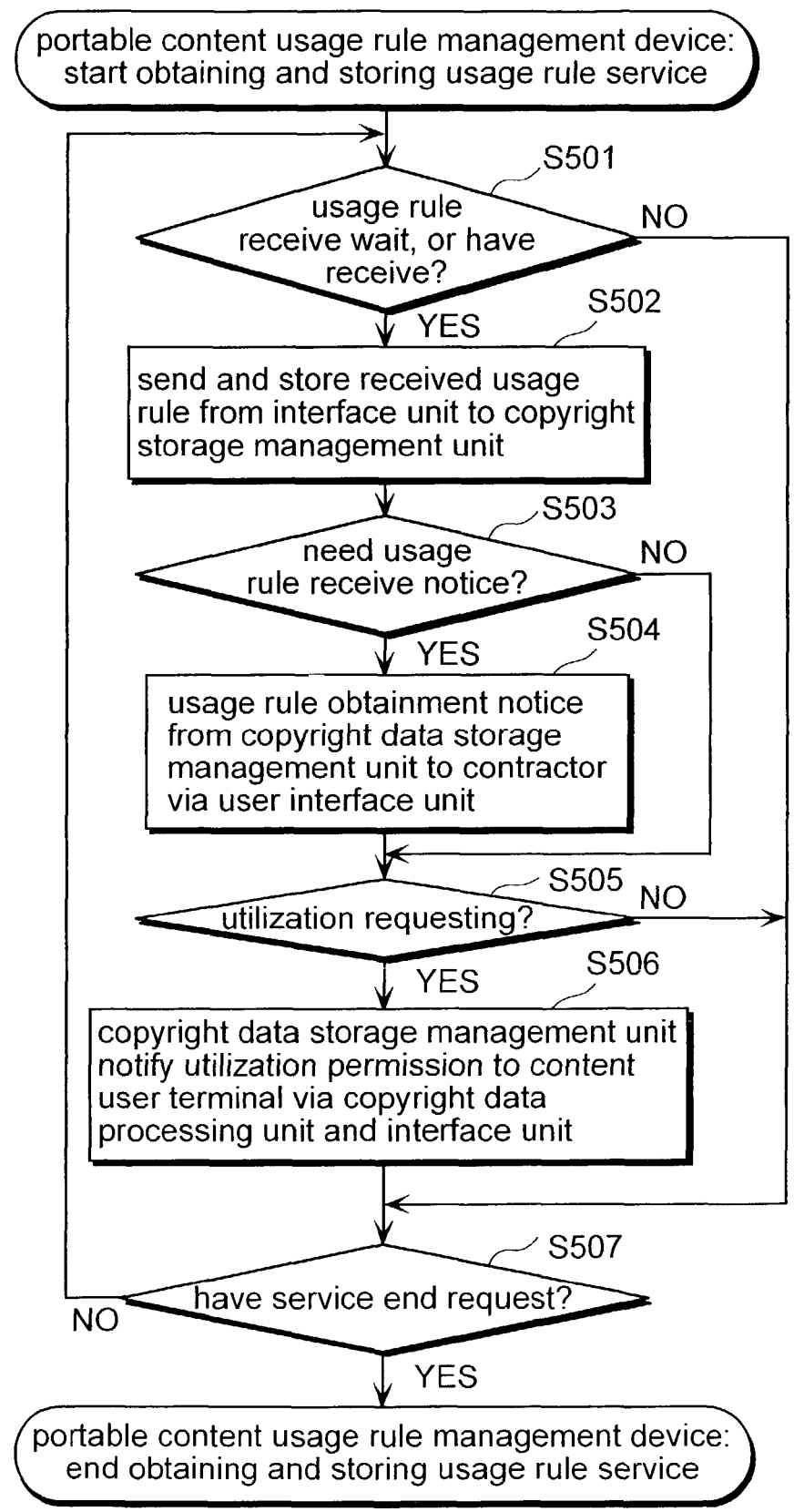
FIG. 5 is a flow chart that shows a processing procedure for obtaining and storing a usage rule in the portable content usage rule management device A shown in FIG. 2.
Figure 6:
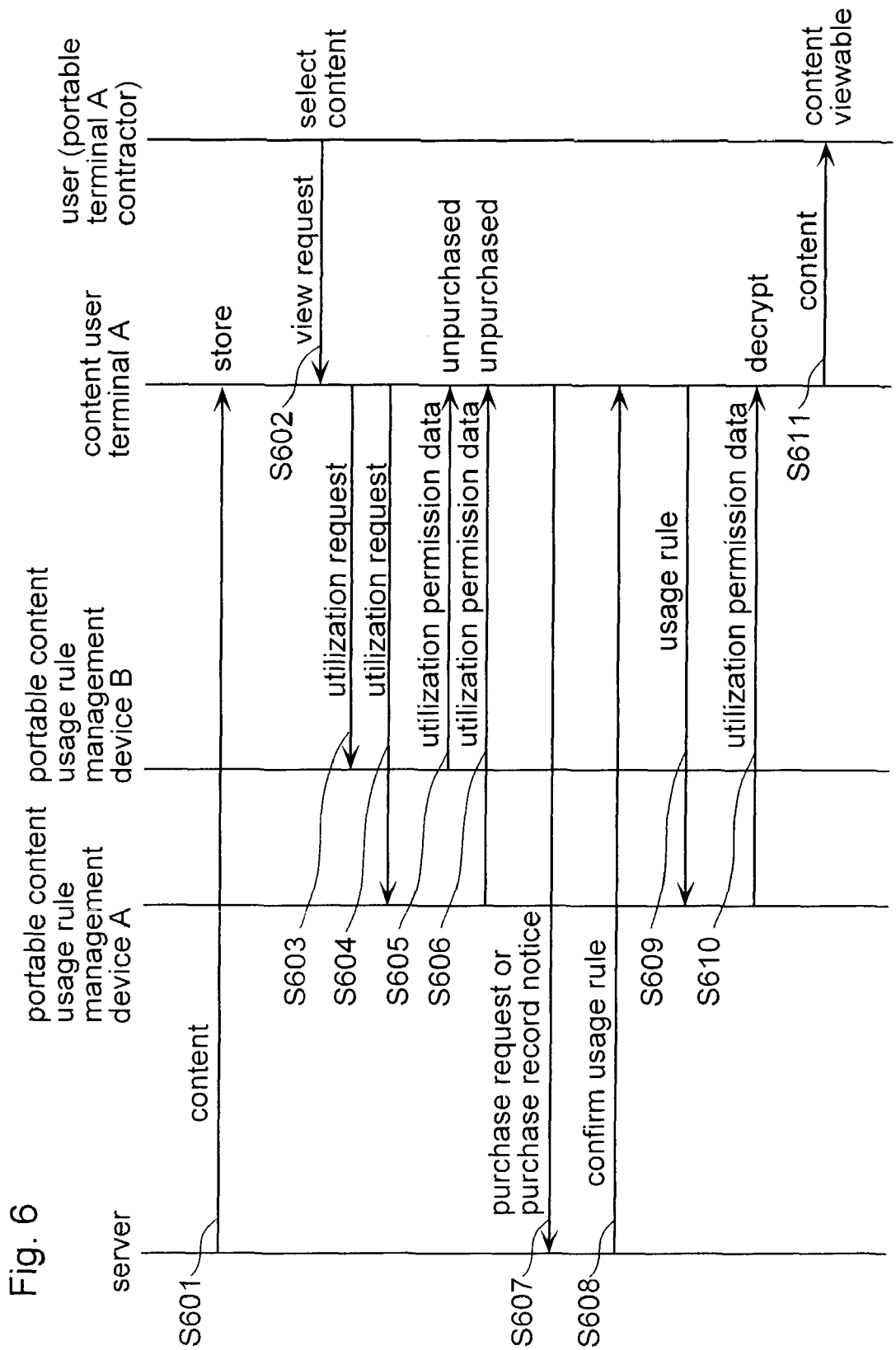
FIG. 6 is a sequence diagram of a communication among a content user terminal A, a portable content usage rule management device A and a server upon receipt of a content view request.

FIG. 4 is a flow chart that shows a processing procedure for obtaining and storing the content and the content usage rule in the content user terminal A13 shown in FIG. 2. FIG. 5 is a flow chart that shows a processing procedure for obtaining and storing the usage rule in the portable content usage rule management device A17 of FIG. 2. FIG. 6 is a sequence diagram of a communication among the content user terminal A13, the portable content usage rule management device A17 and the server 11 when the content view is requested.

(1) The server 11 provides a requested content (② and an encrypted usage rule) based on a broadcast schedule or a user request to one or more content user terminal such as the content user terminal A13 and the content user terminal B15 (S601 in FIG. 6)

(2) The content user terminal A13 stores and manages a content (② and an encrypted usage rule) in the storage unit 133 upon receipt of the content from the transmission unit 131 (S401, S402 in FIG. 4).

(3) When users want to view contents stored in the content user terminal A13, log in from the content user terminal A13 and input a view request to the content user terminal A13 by selecting a content from a list of contents displayed in the TV 130 by the utilization unit 135 (S602 in FIG. 6). The content user terminal A13 sends contents utilization requests to the peripheral portable content usage rule management devices A and B by using a wireless communication of the interface unit 137 (S603, S604 in FIG. 6). The portable content usage rule management devices A and B that received a utilization request from the content user terminal A13 checks whether the copyright data storage management unit 173 or the storage unit 133 have a requested usage rule or not. When the copyright data storage management unit 173 has it, it further checks whether the user, who sent the utilization request from the content user terminal A13, is permitted for utilizing its usage rule from the contractor of the portable content usage rule management device A and B. ① When the usage rule requested by the utilization request is not in the copyright data storage management unit 173, the portable content usage rule management devices A and B send the purchase request. ② When the requested usage rule is in the storage unit 133 but it remains encrypted, the portable content usage rule management devices A and B send a purchase record notice as a utilization permission data that indicates the usage rule is unpurchased to the content user terminal A13 (S605, S606 in FIG. 6). Also, when the requested usage rule is in the storage unit 133 or the copyright data storage management unit 173 but not permitted for using its usage rule by the contractor, a notice for utilization "not permitted" as a utilization permission data is sent to the content user terminal A13. The content user terminal A13 that received an utilization permission data for an unpurchase from the portable content usage rule management devices A and B sends ① a purchase request for the usage rule or a providing request or ② purchase record notice for the usage rule to the server 11 (S607 in FIG. 6). The server 11 provides ① the requested usage rule to the content user terminal A13 via the network 1 based on ① the purchase request, a usage rule providing request or ② a purchase record notice from the content user terminal A13 (S608 in FIG. 6). When the case of ②, after the server 11 received a purchase record notice, the server 11 conducts an accounting processing based on the received purchase record notice. And when the case of ②, the server 11 does not conduct a usage rule sending processing.

(4) When the content user terminal A13 ① receives a content usage rule with the transmission unit 131, the interface unit 137 transfers ① the purchased or ② an encrypted usage rule to a portable content usage rule management device A17 designated by a contractor who is a user conducted a purchase proceeding or a provide request of the usage rule (S401, S403 in FIG. 4 and S609 in FIG. 6). In addition, this portable content usage rule management device A17 is mounted a copyright management function.

(5) When the portable content usage rule management device A17 receives the purchased usage rule from the interface unit 177, it transfers the usage rule to the copyright data storage management unit 173, and the copyright data storage management unit 173 stores the usage rule (S501, S502 in FIG. 5).

(6) At this time, when the copyright data storage management unit 173 has a setting for notifying the contractors that the usage rule has been received and stored in the portable content usage rule management device A17, it is able to notify the contractor of the usage rule (the content data and the usage rule data may well be included) which has been obtained by sending data indicating the usage rule is stored in the user interface unit 179 (S503, S504 in FIG. 5).

(7) The portable content usage rule management device A17 checks whether the content user terminal A13 is in a status of requesting a utilization or not. And when it is in a requesting status, the copyright data processing unit 175 judges whether the user is authorized or not for utilizing the content, after confirming that the usage rule stored in the copyright data storage management unit 173 remains valid and notifies whether the utilization is permitted or not, to the content user terminal A13 via the interface unit 177 (S505, S506 in FIG. 5, S610 in FIG. 6). When the content user terminal A13 is not in a status of requesting an utilization, the following processing will be taken.

(8) When there is a request for the service to end, the portable content usage rule management device A17 ends the service. However when there is no such request, it continues the processing of a receive wait (S507 in FIG. 5).

(9) When there is a service end request, the content user terminal A13 ends the service however, when there is no such request, it continues the processing of a receive wait (S404 in FIG. 4).

Figure 7:
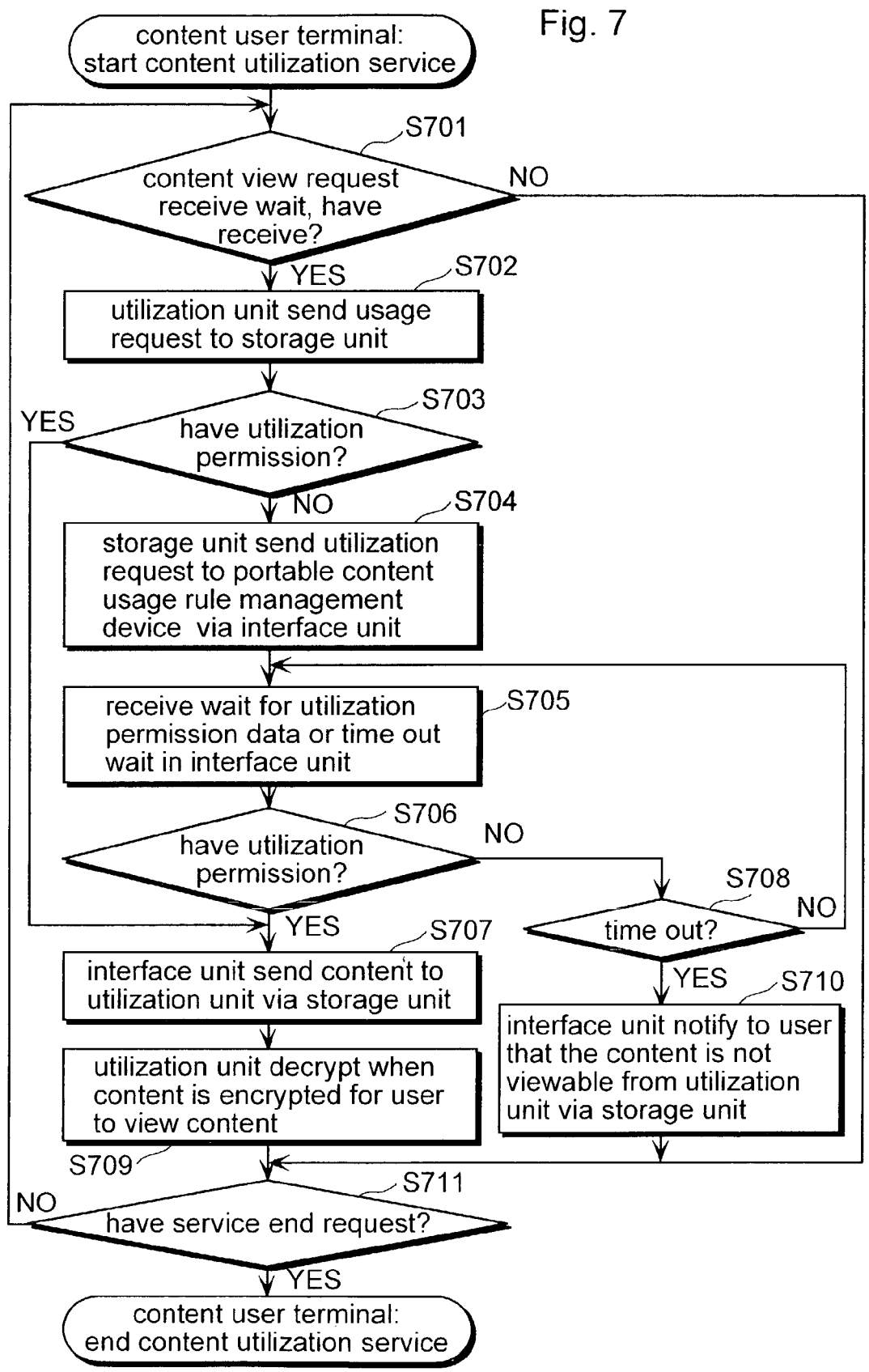
FIG. 7 is a flow chart that shows a processing procedure of the content user terminal A upon receipt of a content utilization request.
Figure 8:
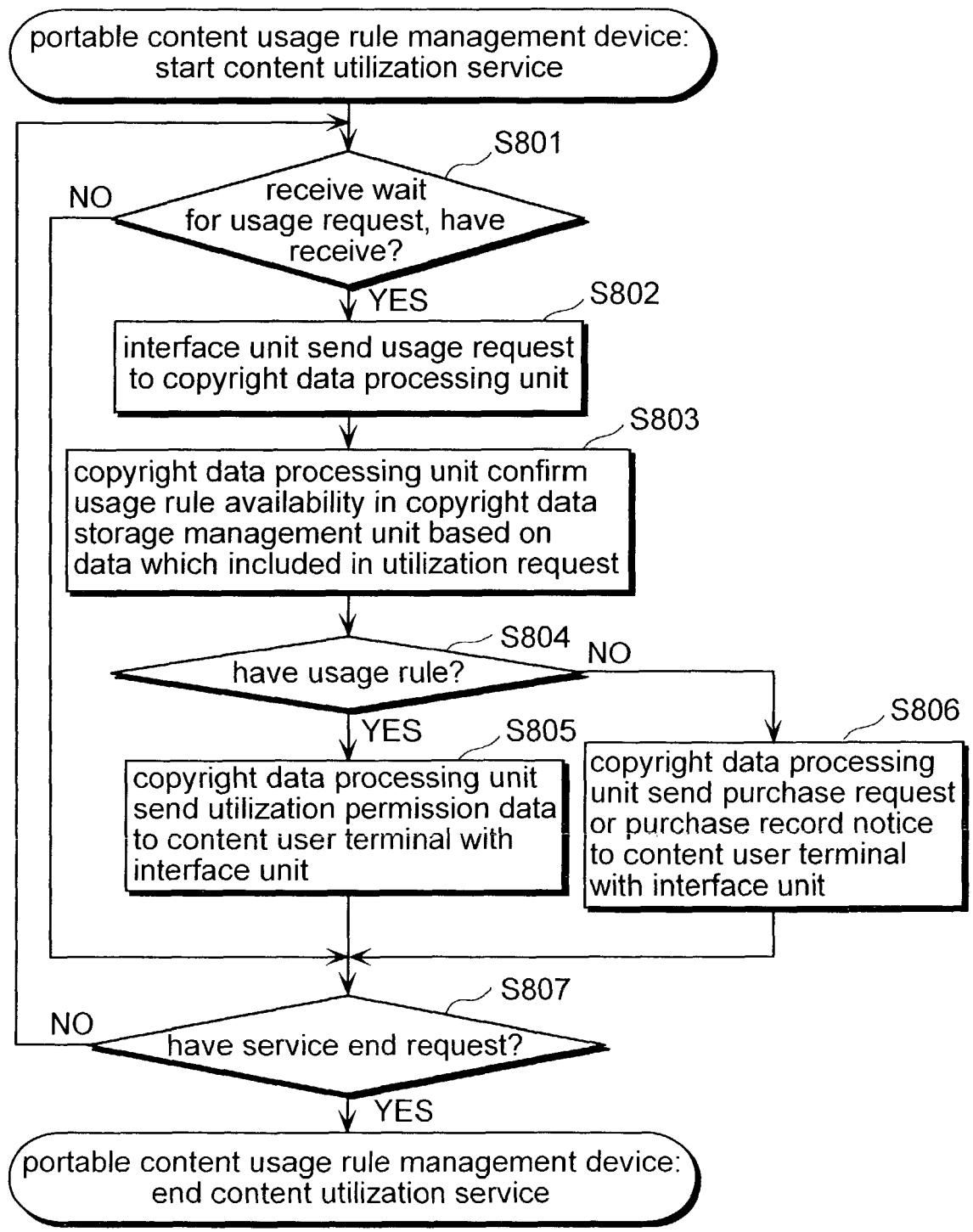
FIG. 8 is a flow chart that shows a processing procedure of the portable content usage rule management device A upon receipt of the content utilize request.

In accordance with the usage rule obtained as above, the processing for utilizing contents (playback or printout of the content) are to be explained with reference to FIG. 6, FIG. 7 and FIG. 8. Among the processing below, the processing (1) and (2) are the same with the case of obtaining and storing a content and a usage rule. FIG. 7 is a flow chart that shows a processing procedure for the content user terminal A13 when a content usage is requested. FIG. 8 is a flow chart that shows a processing procedure for the portable content usage rule management device A17 when a content usage is requested.

(1) The content user conducts a content view request from the input operable TV 130 or from the remote controller to control the TV 130 and the content user terminal A13 to the utilization unit 135 in the content user terminal, using the content user terminal A13 (S602 in FIG. 6).

(2) When the content user terminal A13 receives the content view request, it issues a utilization request from the usage unit 135 to the storage unit 133 (S701, S702 in FIG. 7).

(3) The storage unit 133 in the content user terminal A13 checks whether a right which corresponding to the received user request (utilization permission data) is already stored in the storage unit 133 or not, and when the data is already stored, it responds to the usage unit 135 for utilizing the data, and the content view is thus possible. On the other hand, when it is not stored inside the storage unit 133, the storage unit 133 issues the utilizing request to the interface unit 137 (S703 in FIG. 7).

(4) When the interface unit 137 in the content user terminal A13 obtains the utilizing request, it sends the utilization request for playing back the content to the portable content usage rule management device (S704 in FIG. 7, S604 in FIG. 6).

(5) When the interface unit 177 receives the utilization request for playing back the content, the portable content usage rule management device A17 transfers it to the copyright data processing unit 175 (S801, S802 in FIG. 8).

(6) When the copyright data processing unit 175 in the portable content usage rule management device A17 accepts the utilization request, it confirms whether the usage rule is stored or not in the copyright data storage management unit 173 based on the data which specifies the content, the user data (a user ID and a password, etc which are input at the time of login) and the content ID, etc. (S803 in FIG. 8).

(7) When the usage rule request is stored in the copyright data storage management unit 173, it checks whether the stored usage rule is purchased or not, and when the usage rule is already purchased, the copyright data processing unit 175 in the portable content usage rule management device A17 sends the utilization permission data is sent to the interface unit 137 in the content user terminal A13 via the interface unit 177 (S804, S805 in FIG. 8).

On the other hand, when the usage rule is not stored, the copyright data processing unit 175 sends ① the purchased request or ② the purchase record notice to the interface unit 137 in the content user terminal A13 via the interface unit 177. And when the case of ②, the copyright data processing unit 175 sends the purchase record notice, after that, sends a utilization permission data to the content user terminal A13 (S806 in FIG. 8, S606 in FIG. 6).

(8) When the interface unit 137 in the content user terminal A13 receives the utilization permission data, and the utilization is permitted, it responds to the utilization unit 135 with the stored corresponding content via the storage unit 133 (S705, S706, S707, S708 in FIG. 7).

On the other hand, when the interface unit 137 does not receive the utilization permission data including the utilization permission, the interface unit 137 notifies the usage unit 135 via the storage unit 133 that the view is not permitted, thus the content will not be play-backed for the object content (S705, S706, S708, S710 in FIG. 7).

(9) When the content is encrypted, the usage unit 135 in the content user terminal A13 decrypts the content with a content key included in the utilization permission data (S709 in FIG. 7, S611 in FIG. 6).

(10) The TV 130 connected to the utilization unit 135 conducts a playback proceeding for the object content and provides the view service to users.

(11) When the service end is requested, the portable content usage rule management device A17 ends the service. However, when the service end is not requested, it continues the processing for a receiving wait (S807 in FIG. 8).

(12) When the service end is requested, the content user terminal A13 ends the service. However, when the service end is not requested, it continues the processing for a receive wait (S711 in FIG. 7).

Figure 9:
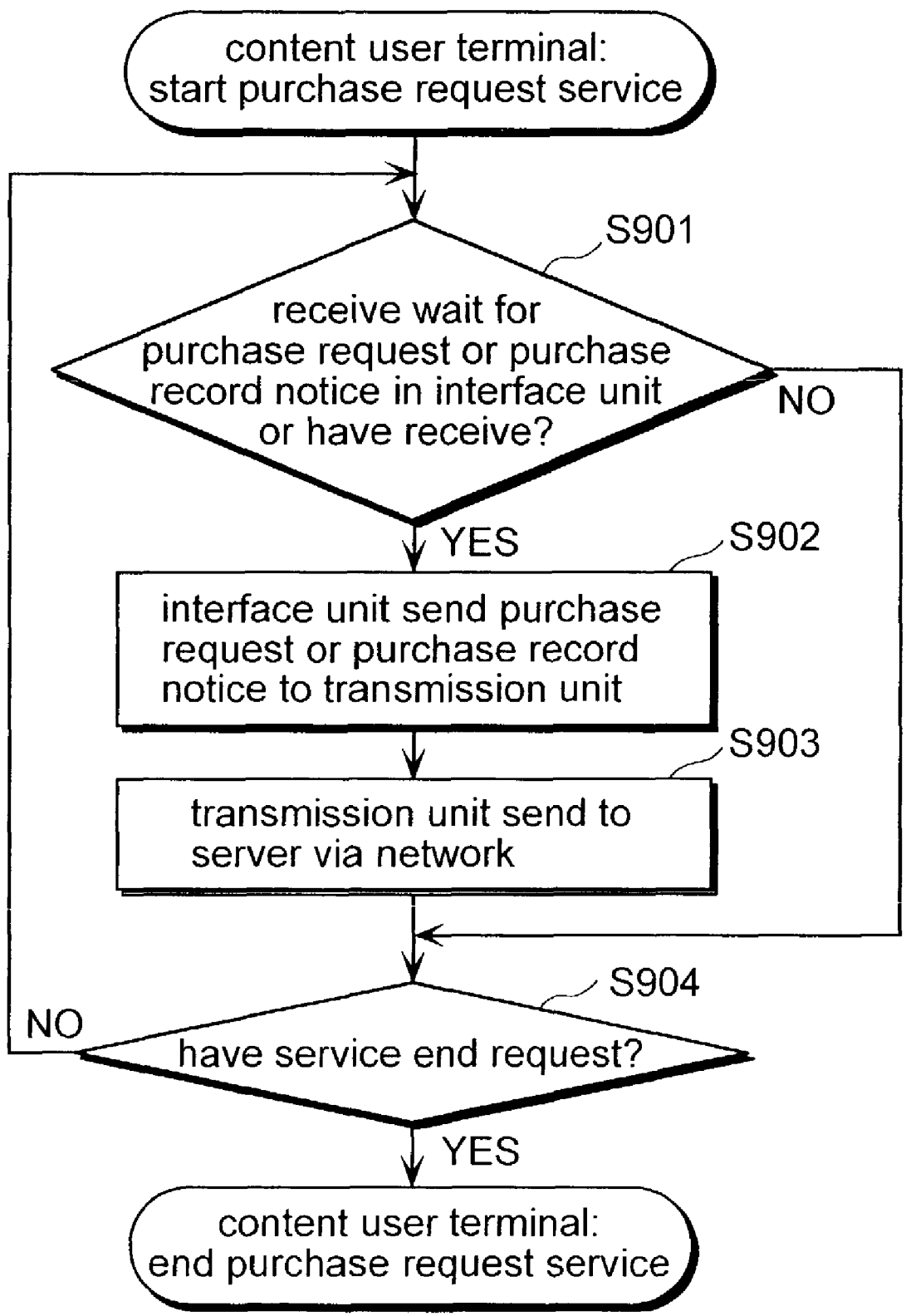
FIG. 9 is a flow chart that shows processing procedure of the content user terminal A upon receipt of a content purchase.

Following is a processing for purchasing an unpurchased content by a utilization request from the content user terminal A13 accompanied by the view request from users with referring to FIG. 6, FIG. 8 and FIG. 9. FIG. 9 is a flow chart that shows a processing procedure for the content user terminal A13 when purchasing the content. In addition, the unpurchased content is a content that simply obtained the content, that is, not obtained the usage rule for utilization. The purchase processing is generally conducted later.

(1) When the requested usage rule is not stored inside the copyright data storage management unit 173 in the portable content usage rule management device A17, the purchase request purchase is sent via the interface unit 177 as a purchase processing, and the copyright data processing unit 175 sends a purchase request or a purchase record notice to the interface unit 137 in the content user terminal A13 (S806 in FIG. 8, S606 in FIG. 6).

(2) When the content user terminal A13 receives the purchase request in the interface unit 137, the received purchase request is sent to the transmission unit 131 (S901, S902 in FIG. 9).

(3) The transmission unit 131 in the content user terminal A13 sends the received purchase request to the server 11 via the network 1 (S903 in FIG. 9, S607 in FIG. 6).

(4) When the server 11 receives the purchase request, the requested usage rule is sent to the content user terminal A13 (S608 in FIG. 6).

(5) When the service end request is sent, the content user terminal A13 ends the service, and when there is no such request, continues the processing for a receive wait (S904 in FIG. 9).

In addition, in the above (1)~(5), the explanation is made to the content purchasing, which accompanied by the utilization request, however, when a user sends the purchase request toward the server 11 with the content user terminal A13 for setting out to purchase the content usage rule from the first time, the content usage rule management system 100 conducts a processing of the steps S607~S609 in FIG. 6. Also, when a user conducts a purchase request from the portable content usage rule management device A17, the purchase request from the user is sent from the portable content usage rule management device A17 to the content user terminal A13, after that, the purchase request is sent form the content user terminal to the server 11 (S607 in FIG. 6). The processing, from now on is as the same with the case for the content user terminal for sending a purchase request (S608, S609 in FIG. 6). Next, when the usage rule, received with the content providing, is encoded for the unpurchased reason, following is an explanation of a processing for purchasing a content with a utilization request from the content user terminal A13 accompanied by a view request from a user referring to FIG. 6, FIG. 8, and FIG. 9.

(1) When the requested usage rule, which is already purchased, is not stored in the copyright data storage management unit 173 in the portable content usage rule management device A17, however the unpurchased usage rule, which remains encrypted, is stored, that is, when the encrypted usage rule is provided accompanied by the providing of the content, the copyright data, processing unit 175 sends a purchase record notice as a utilization permission data that the usage rule is not purchased yet, to the interface unit 137 in the content user terminal A13 via the interface unit 173 (S806 in FIG. 8, S606 in FIG. 6).

(2) When the content user terminal A13 receives a purchase record notice in the interface unit 137, sends it to the transmission unit 131 (S901, S902 in FIG. 9).

(3) The transmission unit 131 in the content user terminal A13 sends a requested purchase record notice to the server 11 via the network 1 (S903 in FIG. 9, S607 in FIG. 6).

(4) When the service end is requested, the content user terminal A13 ends the service, however when there is no such request, the content user terminal A13 continues a processing of a receive wait (S904 in FIG. 9).

The Second Embodiment

Figure 10:
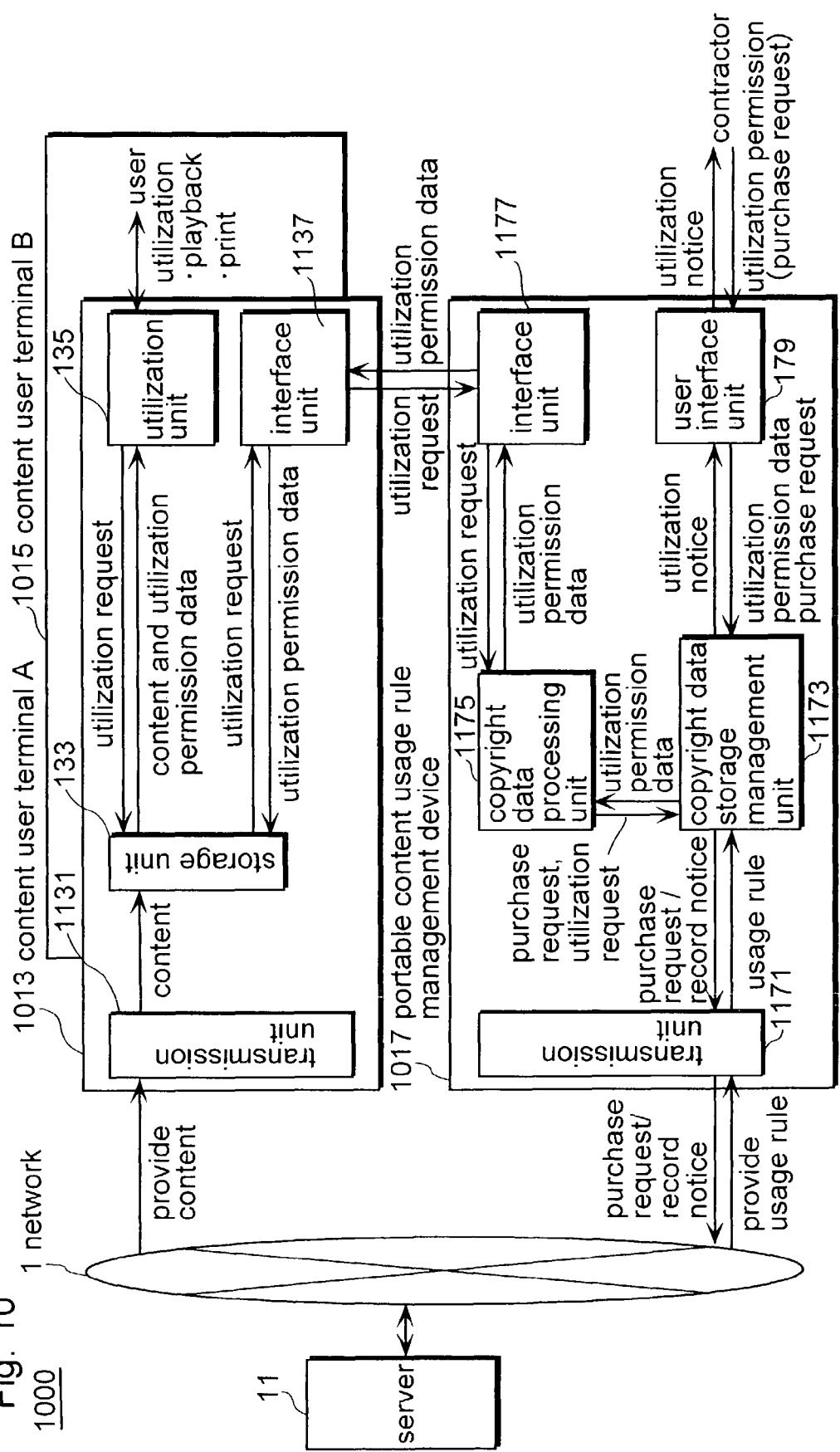
FIG. 10 is a block diagram that shows a detailed overall configuration of the content usage rule management system as shown in FIG. 3B.

FIG. 10 is a block diagram that shows a more detailed over all structure of the content usage rule management system 1000 shown in FIG. 3B. The content usage rule management system 1000 does not have a data transmission function for a content user terminal to transmit the data to a server, but alternatively, it has a portable content usage rule management device that establishes a bidirectional communication with the server and has a content user terminal A1013, a content user terminal B1015, a portable content usage rule management device A1017, a server 11 and a wide area network 1. In the figure, since the same configuration elements with the content usage rule management system 100 according to the first embodiment are put the same reference number, thus, the explanation for those each elements are omitted. In addition, the content user terminal B1015 has the same configuration with the content user terminal A1013.

The content user terminal A1013 is a terminal device that does not establish a bidirectional communication with the server but obtains a usage rule via only the portable content usage rule management device, and includes a storage unit 133, a utilization unit 135, a transmission unit 1131 and an interface unit 1137. The transmission unit 1131 is generally be included as a function unit when the content user terminal A1013 is an STB, and does not have a sending function but has a receiving function for receiving a content from an airwave. The interface unit 1137 transmits a utilization request, a purchase request, a utilization permission data and a usage rule, etc to the interface unit 1177 in the portable content usage rule management device A1017.

The portable content usage rule management device A1017, that is equipped with a copyright management function, is a portable device to establish a bidirectional communication with the server 11 and has a copyright data storage management unit 1173, a user interface unit 179, a transmission unit 1171, a copyright data processing unit 1175 and an interface unit 1177. The transmission unit 1171, is generally included when the potable content usage rule management device A1017 is a portable phone device, communicates with the server 11 via the wide area network 1 for receiving a usage rule that is provided by the server 11 from the portable phone line network. The copyright data storage management unit 1173 stores and manages the usage rule received by the transmission unit 1171. When the usage rule for the utilization request received by the interface unit 1177 is not stored in the copyright data storage management unit 1173, the copyright data processing unit 1175 sends a purchase request or a notice of a purchase record to the transmission unit 1171 via the copyright data storage unit 1173. The interface unit 1177 receives a utilization request from the interface unit 1137 in the content user terminal A1013 and sends a utilization permission data of the requested content for the received utilization request to the interface unit 1137.

Figure 11:
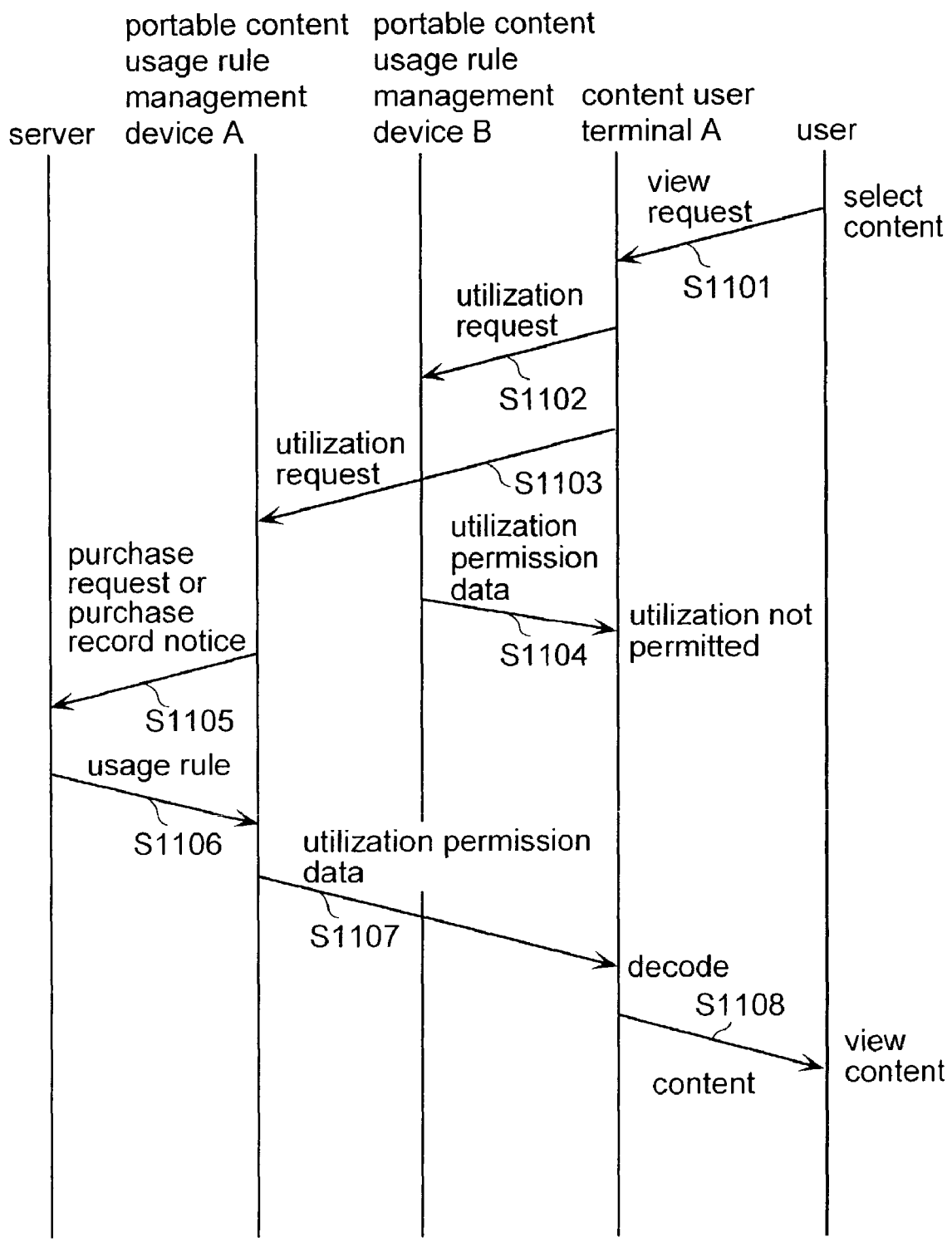
FIG. 11 is a sequence diagram of a communication among a content user terminal A, portable content usage rule management device A and B, and a server upon receipt of content view request.

Following is a detailed explanation for the operation of the content usage rule management system 1000 as composed above, referring to FIG. 6, FIG. 7, FIG. 11 and FIG. 12. FIG. 11 is a sequence diagram for the communication among the content user terminal A1013, the portable content usage rule management device A, B and the server 11 when the content view request is made. In the Figure, a content is already stored in the storage unit 133 and the utilization permission data, for the content to be viewed when the view request is made, shall not be stored in the storage unit 133 in the content user terminal A1013.

(1) When the usage rule, requested with the utilization request, is not stored in the storage unit 133, the content user terminal A1013 sends a content utilization request to the portable content usage rule management device A and B using a wireless communication function of the interface unit 1137 (S1101, S1102 in FIG. 11).

(2) The portable content usage rule management device A and B, received the utilization request from the content user terminal A1013, checks whether the usage rule for the utilization request is stored in the copyright data storage management unit 1173 or not. When the usage rule is stored, a user, who logged in from the content user terminal A1013, checks whether the utilization for the usage rule is permitted or not by each contractor of the portable content usage rule management device A and B based on a contracting related data, that is pre-created by the contractor of the portable content usage rule management device A and B such as a set data in which the usage rule is shared within a family or not. When the utilization for the usage rule is not permitted, a notice for "not-permitted" is sent as a utilization permission data to the content user terminal A1013 (S1104 in FIG. 11). Also, when the content utilization request based on the usage rule is permitted by the contractor of the portable content usage rule management device A, the utilization permission data including a key for decoding an encrypted of the content is sent to the content user terminal A1013.

(3) When the usage rule is not stored in the copyright data storage management unit 1173, the portable usage rule management devices A and B check a utilization permission of the contractor based on the contractor related data. When the contractor is permitted for its utilization, the copyright data processing unit 1175 sends ① purchase request or ② a purchase record notice to the server 11 via the copyright data storage management unit 1173 and the transmission unit 1171 (51105 in FIG. 11). When only the case of ①, the server 11 provides the requested usage rule based on the purchase request or the purchase record notice of the portable content usage rule management device A via the broad network 1 (S1106 in FIG. 11). When the case of ②, the portable content usage rule management device A1017 does not proceed the S1106 but conducts the S1107.

(4) ① When the portable content usage rule management device A1017 receives the usage rule with the transmission unit 1171, stores the usage rule to the copyright data storage management unit 1173. In this bout, when the notice, for which to notify that the usage rule is received/stored in the portable content usage rule management device A1017 to the contractor, is setup, the copyright data storage management unit 1173 is able to notify to the contractor for the usage rule (the content data and the usage rule data may well be included) for its obtainment. ①② The copyright data processing unit 1175 obtains a utilization permission data for the utilization permission including a key and sends it to the content user terminal A1013 via the interface unit 1177 (S1107 in FIG. 11).

(5) The utilization unit 135 in the content user terminal A1013 obtains the utilization permission data from the portable content usage rule management device A via the interface unit 1137 and the storage unit 133, and decodes the encrypted content. As a result, the user is able to view the requested content (S1108 in FIG. 11).

Figure 12:
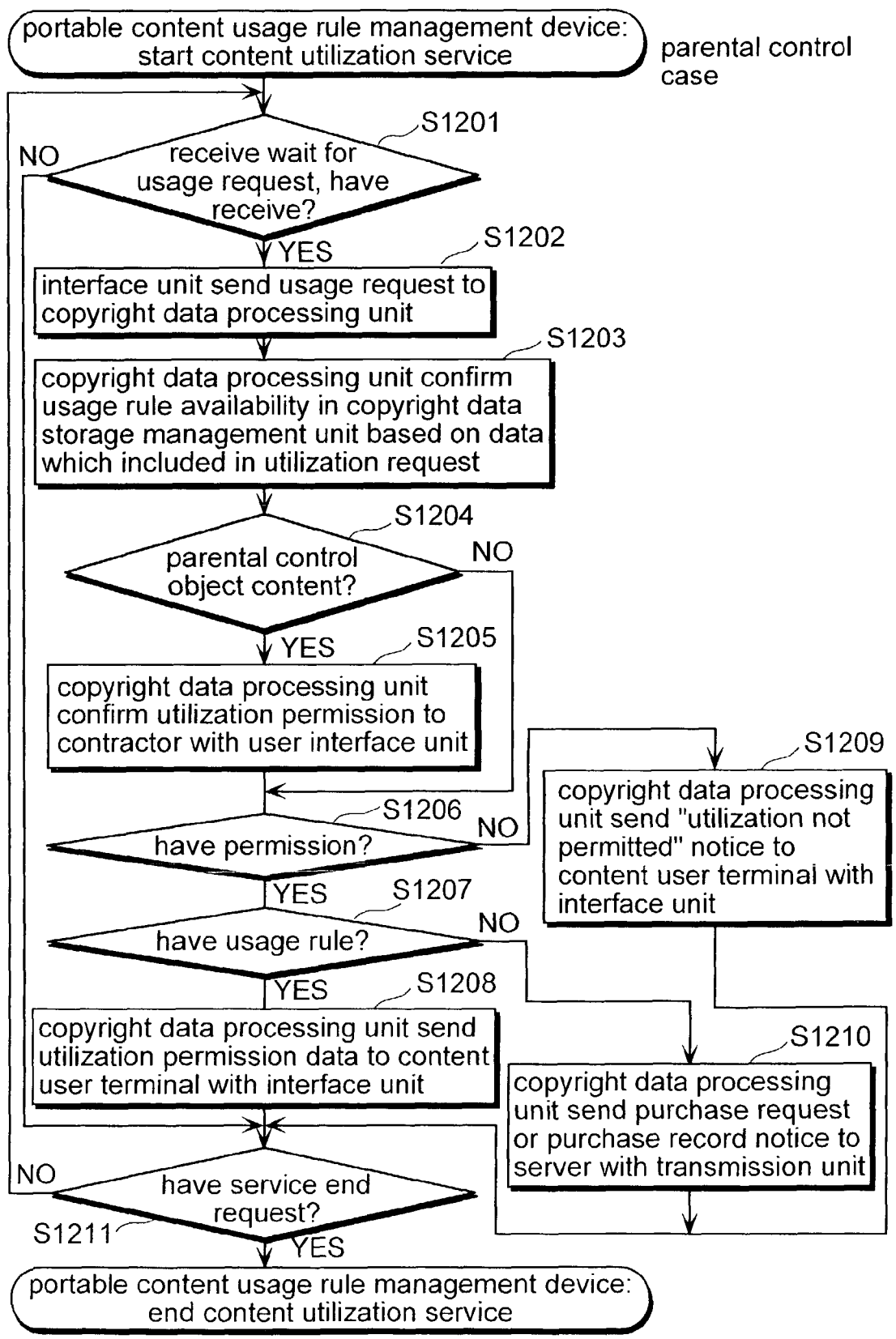
FIG. 12 is a flow chart that shows an operation of the portable content usage rule management device A when a parental control is conducted for the content utilization.

Following is an explanation for the content utilization such as a playback in the content usage rule management system 1000 when the content user and the contractor is different person, that is, for example, when a parental control is conducted, referring to FIG. 6, FIG. 7, FIG. 11 and FIG. 12. FIG. 12 is a flow chart that shows an operation of the portable content usage rule management device A when conducting a parental control at the time of the content utilization.

(1) A content user (i.e. children) inputs a content view request from the TV 130, which is possible to input to the utilization unit 135 in the content user terminal A1013 or from a remote controller which is to control the content user terminal A1013 the TV 130 (S602 in FIG. 6, S1101 in FIG. 11).

(2) When the content user terminal A1013 receives a content view request, sends a utilization request from the user terminal 135 and the storage unit 133 (S701, S702 in FIG. 7, S1103 in FIG. 11).

(3) When the storage unit 133 in the content user terminal A1013 has already stored the accepted right which corresponds to the accepted utilization request, replies the utilization data as it is to the user terminal 135, accordingly the user is able to view the content. On the other hand, when the right is not stored in the storage unit 133, the storage unit 133 issues a utilization request to the interface unit 1137 (S703 in FIG. 7).

(4) When the interface unit 1137 in the content user terminal A1013 accepts a utilization request, sends a content playback utilization request to the portable content usage rule management device A1017 which is a portable device that a contractor, who holds the obtained usage rule (i.e. a parent), takes along (S704 in FIG. 7, S607 in FIG. 6).

(5) When the portable content usage rule management device A1017 receives a content playback utilization request in the interface unit 1177, sends a utilization request to the copyright data processing unit 1175 (S1201, S1202 in FIG. 12).

(6) When the copyright data processing unit 1175 in the portable content usage rule management device A1017 accepts a usage rule, checks a usage rule storage to the copyright data storage management unit 1173 based on a user data or a data that specify a content such as a content ID (S1203 in FIG. 12).

(7) When a content, which is a utilization object, is a parental control object content that has a view limitation by the pre-created contractor related data, the copyright data processing unit 1175 in the portable content usage rule management device A1017 restricts the content utilization based on the content user level (age) which the contractor preset. More specifically, the copyright data processing unit 1175 conducts a confirmation (parental control) of the utilization permission to the contractor (S1204, S1205 in FIG. 12). When the contractor sends a permission for a utilization via the user interface unit 179 (S1206 in FIG. 12), and the requested purchased usage rule is stored in the copyright data storage management unit 1173 (S1207 in FIG. 12), the utilization permission is sent to the content user terminal A1013 via the interface unit 1177 (S1208 in FIG. 12).

On the other hand, when the contractor does not permit (S1206 in FIG. 12), a "utilization not permitted" notice is sent to the content user terminal A1013 via the copyright data storage management unit 1173, copyright data processing unit 1175 and the interface unit 1177 (S1209 in FIG. 12).

Also, when there is a case that although the utilization permission is given by the contractor (S1206 in FIG. 12), but ① the purchased usage rule has not stored yet or a case that when ② the usage rule is stored but it is encrypted, the copyright data processing unit 1173 sends ① a purchase request or ② a purchase record notice to the server 11 (S1105 in FIG. 11, S1210 in FIG. 12). The server 11 sends the requested usage rule to the portable content usage rule management device A1017 (S1106 in FIG. 11).

(8) The transmission unit 1171 in the portable content usage rule management device A1017 stores ① the received usage rule to the copyright data storage management unit 1173 and sends the utilization permission data including a content key to the content user terminal A1013 ①② via the interface unit 1177 (S1107 in FIG. 11). The interface unit 1137 in the content user terminal A1013 receives the utilization permission data from the portable content usage rule management device A1017. When the utilization is permitted, the interface unit 1137 sends it to the utilization unit 135 with the corresponding stored content (S705, S706, S707, S708 in FIG. 7).

On the other hand, when the interface unit 1137 does not receive the utilization permission data including the utilization permission, or receives a utilization permission data which is a notice of a "not permitted" data, the interface unit 1137 replies to the utilization unit 135 via the storage unit 133 that the view is not permitted, accordingly the object content is not play-backed (S705, S706, S708, S710 in FIG. 7, S1104 in FIG. 11). In this case, the processing is restarted from the S1211 in FIG. 12.

(9) When a content is encrypted, the utilization unit 135 in the content user terminal A1013 decrypts the content using a content key included in the utilization permission data (S709 in FIG. 7).

(10) The content user terminal A1013 conducts a object content playback processing by the TV 130 connected to the utilization unit 135 and provides the content view service to users (S1108 in FIG. 11).

(11) When there is a request for service end, the portable content usage rule management device A1017 ends the service however, when there is no such request, it continues the processing of a receive wait (S1211 in FIG. 12).

(12) When there is a request for service end, the content user terminal A1013 ends the service however, when there is no such request, continues the processing of a receive wait (S711 in FIG. 7).

Figure 13:
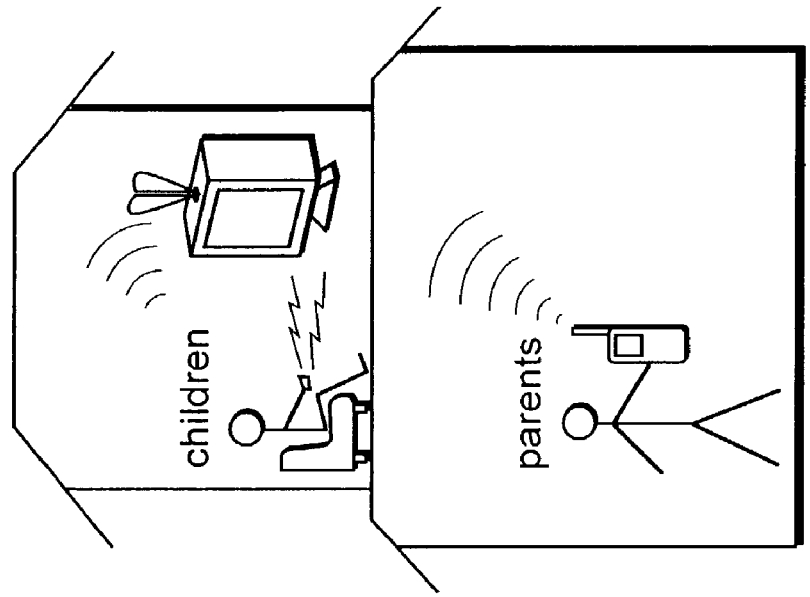
FIG. 13A is a diagram that shows an example of a group register data 1300 when a family is registered in a group.
FIG. 13B is a diagram that shows an example of a parental control data which contains a family data registered in the group except parents.
FIG. 13C is a diagram that shows an example of embodiment for use when the content utilization is under parental control.

FIG. 13 is a diagram that shows an example of a parental control in the "group shared (family-only)" mode in the content usage rule management system 1000 of FIG. 10. FIG. 13A is a diagram that shows an example of a group register data 1300 when a family member is registered in a group. FIG. 13B is a diagram that shows an example of a parental control data 1300 for a family except parents. FIG. 13C is a diagram that shows an example of embodiment for use when the content utilization is being parental controlled.

When the content usage rule management system 1000 is in a "group shared (family-only)" mode and in a status that a content user and a contractor of a content user right are different, however, the both are able to utilize the object content when both are belonged to a same-group. Accordingly, when a desired usage rule is not stored in the portable content usage rule management device A1017, a contractor for which is a content user (i.e. children) and when a user has an access right to a usage rule controlled by a contractor portable content usage rule management device B, a user (child) can utilize a usage rule of the other contractor's (parents) portable content usage rule management device B. As a result, it is possible to share a content usage rule with a family when using a home network. Accordingly, when a family member registered in one group, children can utilize a content using parent's usage rule.

FIG. 13A includes a user name 1301, a user ID 1302, an age 1303 and a level 1304. In the item of the user name 1301, a user name description, that belongs to a same group, for example a name of the "Hami Taro", is written. In the item of the user ID 1302, the content usage rule management system 1000, the description of a user ID "HAM01", which is a specified ID allocated to "Hami Taro", is written for each users. In the item of the age 1303, "36-year-old", which is an age of "Hami Taro", is described. And in the item of the level 1304, a pre-set level, for example, the level "0" is set corresponding to the age "36-year-old" in the content usage rule management system 1000. This level is automatically set according to user's age. When the level "0" which corresponds to adult users, above 20-year-old, the users are given any contents they want without any restriction. Further, in a group registration data 1300, there are two other users registered "Hami Goro" and "Hami Kichi" besides "Hami Taro". "Hami Goro" is in level "2" with his age "17-year-old" specified in the user ID "HAM02", and "Hami Kichi" is in level "3" with his age "12-year-old" specified in the user ID "HAM03". This level is allocated to each contents used in the content usage rule management system 1000. A level for each contents and a user level are compared. When the user level is higher than the level for each contents; the utilization for the content is not permitted, and when the user level is lower than the level for each content, the utilization for the content is permitted, for example. As a result, it is avoidable for juvenile to access to inadequate content for juvenile, roughly. In addition, this level can not only be set in system side, but also be set in each family based on their children growth. Also, it is possible for each family to reset the level set by the system side based on their children growth.

The parental control data 1310 shown in FIG. 13B is pre-created by parents of each family and the data is showing a content utilizing restriction for each child for each content utilizing. The parental control data 1310 describes items of a content ID 1311, a user ID 1312 and a restriction 1313. In the item of the content ID 1311, a content ID to specify each contents (i.e. "MV012") is described. In the item of the user ID 1312, a children user ID to use contents, which are described in the content ID 1311, for example, "HAM 03" is described. In the item of the restriction 1313, a user ID described in the user ID 1312, for example, "Hami Kichi" specified in the "HAM 03" and a content ID described in the content ID 1311. For example, a utilization restriction content (i.e. "need confirmation") is applied when a content, specified in "MV012", is utilized. A content for this usage restriction is indicated in any one of "OK", "NG" and "need confirmation". The "OK" means "no restriction", so it is possible for children to utilize any contents based on their utilization request. The "NG" means "utilization not permitted", so the children can not access to the content. When the "need confirmation" is indicated, a confirmation for utilization permission (a parental control) is conducted to the contractor (parents) via the user interface unit 179. When a specific ID for specific field is allocated to contents, that is, for example, when a content ID for an action movie including a violence scene is set starting with an alphabet "R", it may well be described the whole content ID 1311 in that field with a wild card "*" such as "R****".

The situation such as FIG. 13C is seen in daily lives, that is, while parents are in downstairs, a child is using content in upstairs. In this case, it is difficult to know what kind of content the child is using. To this situation, the parental control data 1310 of FIG. 13B will work very well. When the child upstairs is about to use a content using a usage rule stored in the parent's portable content usage rule management device A1017, parents can set the portable content usage rule management device A1017 to ring a buzzer and to display a confirmation screen to confirm the child's utilization permission. As a result, parents can judge the utilization permission to an inadequate content use request however having their child in a different place where they can't keep an eye on.

The Third Embodiment

Figure 14:
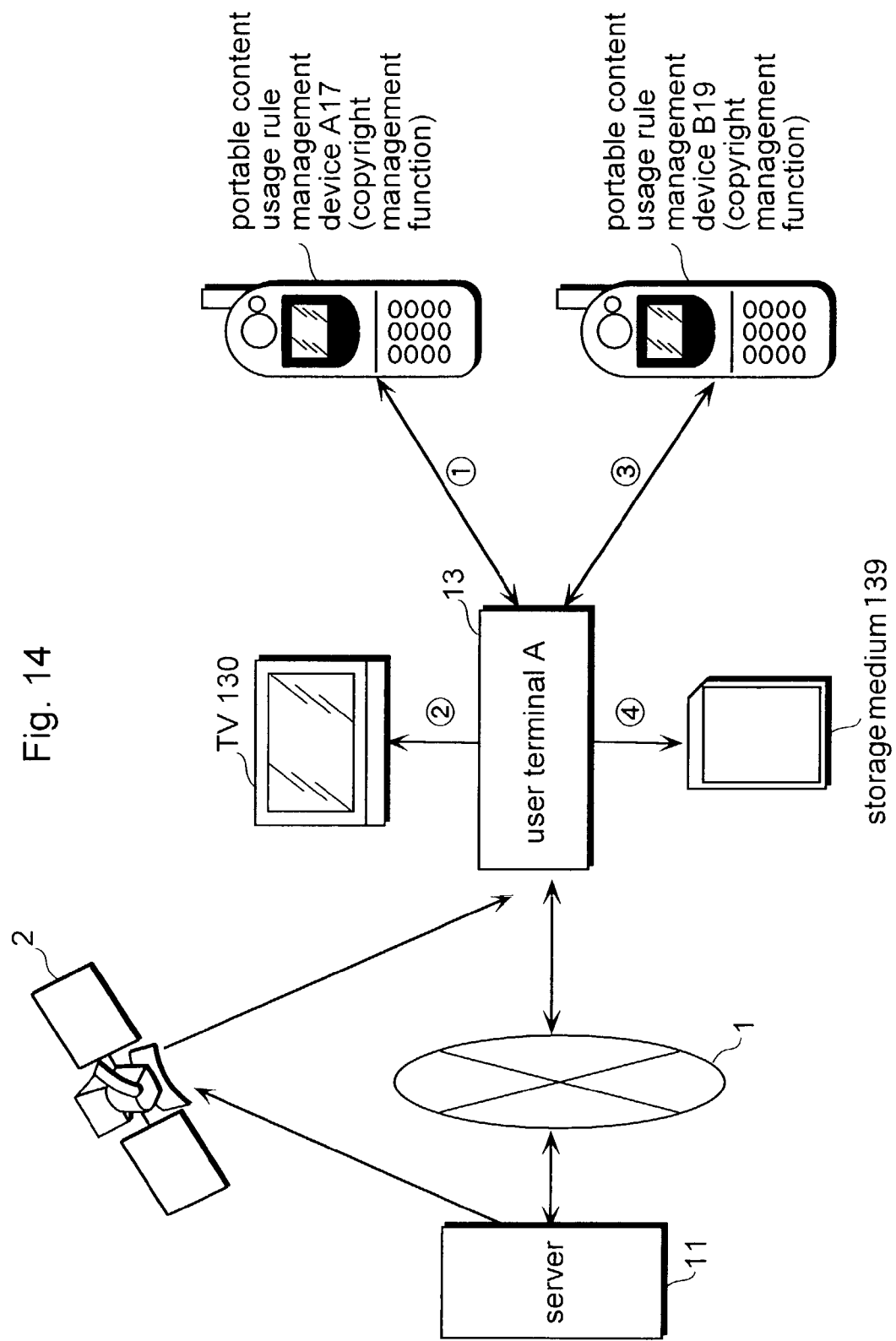
FIG. 14 is a diagram that shows a data flow in the content usage rule management system when the utilization unit in the content user terminal A1 has an IC card driver.

Following is an explanation for the utilization unit 135 in the content user terminal A13 of FIG. 2 according to the first embodiment, when the utilization unit 135 has a driver function for an IC card, a storage media 139 as a user interface. FIG. 14 is a diagram that shows a data flow in the content usage rule management system 100 when the utilization unit 135 in the content user terminal A13 of FIG. 2 has an IC card driver. As shown in FIG. 14, by having a reading out and a writing function to a content and a content usage rule of the storage media 139 in the utilization unit 135 of the content user terminal A13, the following processing can be taken;
① while a contractor who has a portable usage rule management device A17
② views the TV 130 connected to the content user terminal A13,
③ another contractor who has a portable content usage rule management device B19
④ can move the content and the content usage rule to the storage media 139 connected to the same user terminal A13.

As a result, with this invention, it is able to carry on a utilization request processing from a plurality of contractors at the same time in the content user terminal A13.

Following is an explanation of an example for an operation of the content usage rule management system 100 when a plurality of contractors use one content user terminal A13 using the content usage rule management device A17 and the portable content usage rule management device B19 as conjured as FIGS. 2 and 14.

Figure 15:
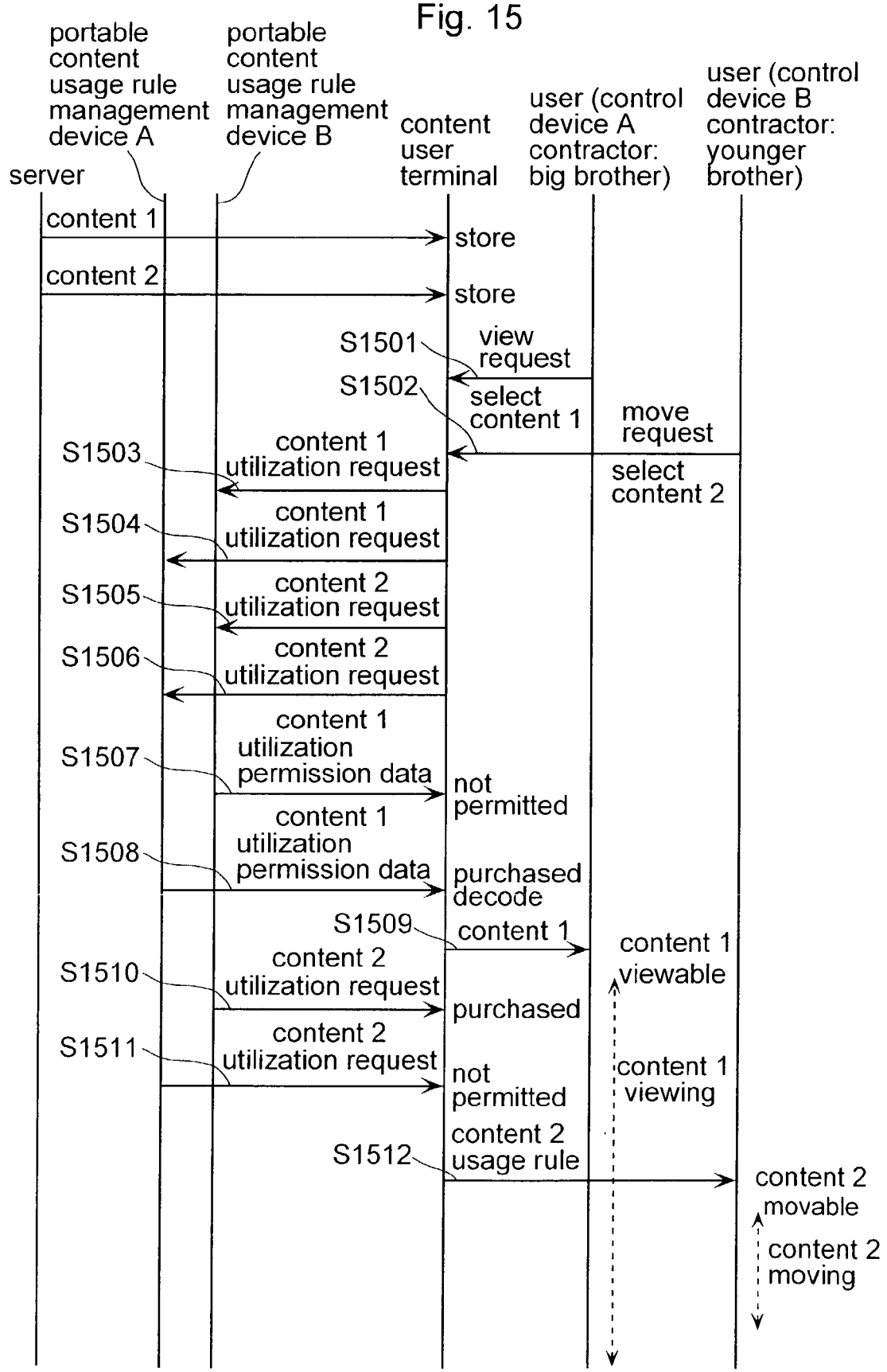
FIG. 15 is a sequence diagram for a communication among a content user terminal A, a portable usage rule management device A and B.

First of all, a processing for utilization in parallel is described referring to FIG. 2 and FIG. 15. FIG. 15 is a sequence diagram for a communication among a content user terminal A13, a portable usage rule management device A17 and B19, and a server 11, when a plurality of contractors use the content user terminal A13 in parallel. In the Figure, the content 1 and the content 2 shall previously be stored in the storage unit 133 of the content user terminal A13.

(1) A content user (i.e. a big brother) sends a view request for desired content (i.e. content 1 for a movie) from an operation unit in the TV 130 connected to the utilization unit 135 in the content user terminal A13 or from a remote controller to control the TV 130 using the content user terminal A13 (S1501 in FIG. 15).

(2) The utilization request by the content user (the big brother) is confirmed for an availability of the usage rule and a utilization for the content using the nearby portable content usage rule management device including the content user terminal A13 and the portable content usage rule management device A17 with a wireless communication (S1503, S1504 in FIG. 15), and specifies the portable content usage rule management device A17 which stored a usage rule, and thus a view availability is determined (S1507, S1508 in FIG. 15).

(3) When the content user (the big brother) is utilizing a content, other content user (i.e. a younger brother) sends a content move request for another content (i.e. content 2 for a music) to the storage medium 139 which is able to output from the utilization unit 135 in the content user terminal A13 (S1502 in FIG. 15).

(4) The utilization request from the content user (the younger brother) is confirmed for its availability of the usage rule and a utilization for the content using the nearby portable content usage rule management device including the content user terminal A13 and the portable content usage rule management device B19 with a wireless communication (S1505, S1506 in FIG. 15) and specifies the portable content usage rule management device B19 which stored a usage rule, and thus a movement for the content 2 is permitted or not is determined (S1510, S1511 in FIG. 15).

(5) At this time, the utilization request of each content user (the brothers) is made at the same time, however, it is unnecessary for each content user to switch their IC card, which has a copyright management function inserted into the content user terminal A13, with each user as the case of the conventional system configuration shown in FIG. 1. It is possible to use a same user terminal in parallel (viewing for the content 1 on and after S1509 in FIG. 15, move for the content 2 on and after S1512 in FIG. 15).

Following is an explanation of examples for a judge processing for a usage rule search, a priority order, and an access right referring to FIG. 6, FIG. 16, FIG. 17, FIG. 18 and FIG. 19.

(1) The content user terminal A13 sends a utilization request for all portable content usage rule management devices as far as the devices are in a communicable situation by the interface unit 137 (S603, S604 in FIG. 6).

(2) The portable content usage rule management device, which received the utilization request from the content user terminal A13 in the interface unit 177 of FIG. 2, compares the user and contractor in the copyright processing unit 175 when there are one or more portable content usage management devices, such as the case that there are two devices, the portable content usage rule management device A17 and the portable content usage rule management device B19. More particularly, pre-set the access right to a usage rule in each purchased contents. For example, when it is in a "group-shared (family-only)" mode, although the content user and the contractor is different, it is accessible to the object content unless both are belonged to the same group. Accordingly, when a desired usage rule is not stored in the portable content usage management device A17, the contractor for which is a content user, the other contractor's portable content usage rule management device B19 can be used unless there is an access right to the usage rule in the other contractor's portable content usage rule management device B19. As a result, it is able to share the content usage rule with a family member in the home network.

The access way to the usage rule from a plurality of users is described in a part where a variety of rights within the usage rule related data is described. FIG. 16 is a diagram that shows an example of a data format for the usage rule. FIG. 17 is a diagram that shows an example of a data format of a content key descriptor for the usage rule of FIG. 16. FIG. 18 is a diagram that shows an example of a data format of the preview key descriptor for the usage rule of FIG. 16. FIG. 19 is a diagram that shows an example of a data format of a right data descriptor for the usage rule shown in FIG. 16. As shown in FIG. 16, the usage rule provided from the server 1 includes a header unit (not encrypted), an encrypted payload and an encrypted trailer unit. In the herder unit, a bibliography data (i.e. a data length, an encrypted type, and an expiration date) is described. In the payload unit, the content of the usage rule, that is, a data indicating quantitatively in a scope of right for the usage rule, is described. And in the trailer unit, a hashing value, for detecting a tamper is described.

As shown in FIG. 16, a content key of FIG. 17, a preview key of FIG. 18 and a right data of FIG. 19, which are described in a variable length form, are included in the usage rule in the payload unit. A content key for decoding a content encryption is included in a base unit of the content key descriptor. The preview content can be the content that pre-created for preview, and the playback content is for previewing a part of the content. In the basic unit of the right data descriptor, a descriptor number for specifying a type of the content utilization, a right permission for indicating a number of utilization permission of the specified type, and an access right for indicating a utilization type of the usage rule are described. There is a case that the above descriptors are included in one usage rule, such as a case that there are various types of utilization for one content. For example, when a music content case, there are various types of utilization such as a "playback" to playback music in the content user terminal A13, a "Move" to move the usage rule to a recording medium and a "Print" to print a lyric sheet enclosed in a music content. In such a case, the right data descriptor can be described in each utilization and be included in one usage rule.

Whether the usage rule, indicated in the above "group shared (family-only)" mode, is sharable or not is described in the item of the access right for the right data descriptor. For example, when "0x00" is described in this access right item, only a contractor can use the usage rule. When "0x01" is described, anybody within a group that members are family can use the usage rule. And when "0xFF" is described, anybody can use this usage rule without any restriction.

(3) On the other hand, when there is a plurality of usage rules for a specific content, the content user terminal A is given a top priority to use the utilization request in the portable usage rule management device A17 for which the content user is a contractor.

(4) Further, when a utilizable usage rule is not stored in any portable content usage rule management devices which are devices that is existed in a communicable area (i.e. within an area the radio wave can be reached) for the content user terminal A13, the content user terminal A13 notifies the content users that the requested content can not be utilized with only the usage rule from the utilization unit 135 and, if necessary, sends a purchase request or a purchase record notice to the server 11.

Figure 20:
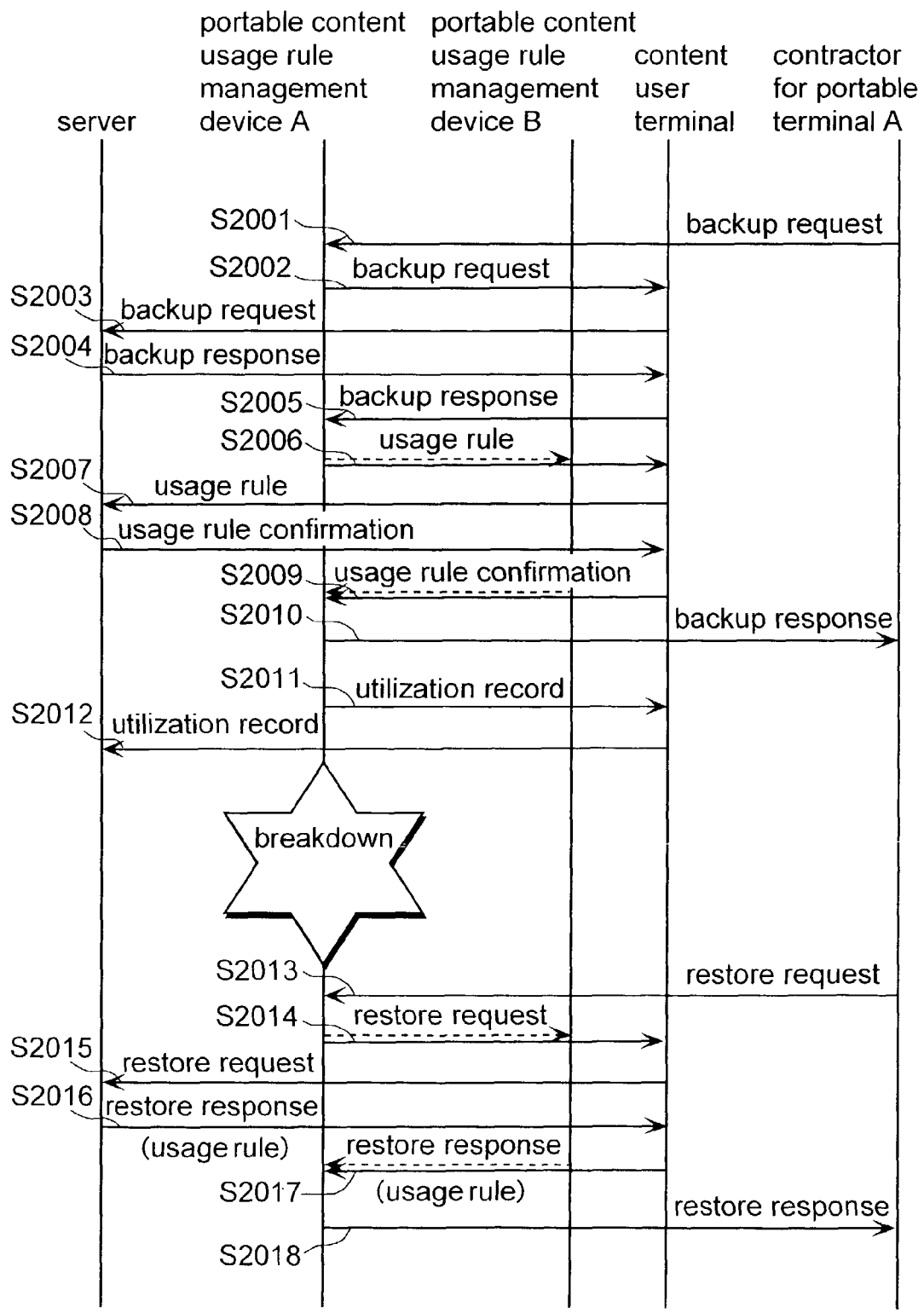
FIG. 20 is a sequence diagram for a communication among the content user terminal A, the portable content usage rule management device A, B and the server when requesting a backup/restore for the usage rule.

When a content usage is diminished, the following is an explanation of an example of a processing of backup and restore referring to FIG. 20. FIG. 20 is a sequence diagram for a communication among the content user terminal A13, the portable content usage rule management device A17, B19 and the server 11 when requesting a backup/restore for the usage rule. In addition, although not shown in Figures, a portable content usage rule management device A1017, explained in the second embodiment, is also explained.

(1) A contractor of the portable content usage rule management device A17 sends a backup request to the user interface unit 179 in the portable content usage rule management device (S2001).

(2) The portable content usage rule management device A17 sends the backup request to the server (S2003) via the content user terminal A13 (S2002). The portable content usage rule management device A1017 configured as FIG. 10 sends the backup request directly.

(3) The server 11 receives a backup request of the portable content usage rule management device A17, and sends a backup response to the portable content usage rule management device A17 (S2005) via the content user terminal A13 (S2004). The portable content usage rule management device A1017 sends the backup response to the portable content usage rule management device A1017 directly.

(4) The portable content usage rule management device A17 backups (S2007 in FIG. 20) the usage rule in the portable content usage rule management device A17 by sending and requesting the usage rule stored inside the portable usage rule management device A17 to the server 11 or the other portable content usage rule management device B19 via the content user terminal A13 (S2006).

(5) When the portable content usage rule management device A17 receives (S2008, S2009) a usage rule confirmation which is for confirming a backed up usage rule content from the server 11 or the portable content usage rule management device B19, notifies to a contractor of the portable content usage rule management device A17 that the backup is completed with a backup response (S2010).

(6) When the usage rule in the portable content usage rule management device A17 is utilized, the portable content usage rule management device A17 sends a utilization record to the server 11 (S2012) via the content user terminal A13 (S2011). The portable content usage rule management device A1017 sends the utilization record, directly to the server 11.

(7) When the portable content usage rule management device A17 is broken down and the usage rule inside the portable content usage rule management device A17 is diminished, a fixed portable content usage rule management device A17 or new portable content usage rule management device sends a utilization request for a backed up usage rule to the server or the portable content usage rule management device B19 (S2013, S2014, S2015).

(8) When the server 11 receives the restore request, it confirms the utilization record of the portable content usage rule management device A17, and when the server 11 is to backup, deletes a backup data and provides the usage rule as a restore response to the portable content usage rule management device A17. When the portable content usage rule management device B19 is the device for backup, it deletes own back up data and provides the backed up usage rule to the portable content usage rule management device A17 (S2016, S2017).

(9) When the portable content usage rule management device A17 receives the usage rule from the server 11 or the portable content usage rule management device A17, it notifies to a contractor of the portable content usage rule management device A17 that the restore is completed with a restore response (S2018).

FIG. 21 is a diagram that shows an example of a data format for communication data between a content user terminal and a portable content usage rule management device. As shown in the Figure, the communication data between the content user terminal and the portable content usage rule management device includes a not encrypted header unit, an encrypted payload unit and a trailer unit, same with the usage rule. In the header unit, an destination address to indicate a destination for communication data, a source address to indicate a sender, a telegraphic ID to indicate a types of communication for communication data, and a sequence number to indicate a number when sending a communication data in a packet are described. The destination address and the source address may well be described with a terminal ID or a user ID. And of course, it may well be described with an address. In the payload unit, a content ID for specifying a content and data which is a details of the communication data for each telegraphic message are described. A usage rule shown in FIG. 16, for example, is inserted into the data for each telegraphic message. In the trailer unit, a CRC for detecting a transmission error for the communication data or a tamper are described.

As explained above referring to FIG. 3A and FIG. 3B, it is possible to utilize contents with one portable content usage rule management device A17 using the TV 130 and the TV 150 connected to a plurality of content user terminals such as the user terminal A13 and the user terminal B14 by equipping a copyright management function to a portable content usage rule management device. In addition, the FIG. 3B case, it is possible for the user terminal A13 and the user terminal B15 not to equip a communication function except for the communication function to communicate with the portable content usage rule management device A17 by using the communication function of the portable content usage rule management device A17, thus it is possible to cutout a function which conventionally equipped with a user terminal.

In addition, with the exception of the above embodiment according to the present invention explained above, it is possible to do a processing of sending a purchase request or purchase record notice to the server 11 or obtaining a content usage rule from the server 11 using the transmission unit 171 in the portable content usage rule management device 17 by having the transmission unit 171 in the portable content usage rule management device A17 without a transmission function to the server 11 but only with a receiving function of the transmission unit 131 in the content user terminal A13 shown in FIG. 3B.

This portable content usage rule management device includes also a portable phone device, a PHS terminal, a PDA, a wearable computer, an electronic databook, a high functional watch, and a movable robot, etc. In addition, a portable device will work effectively for applying to this invention, however it is not necessarily to be the portable device. A desk top type such as a desk top computer will also worked well for this invention.

Figure 22:
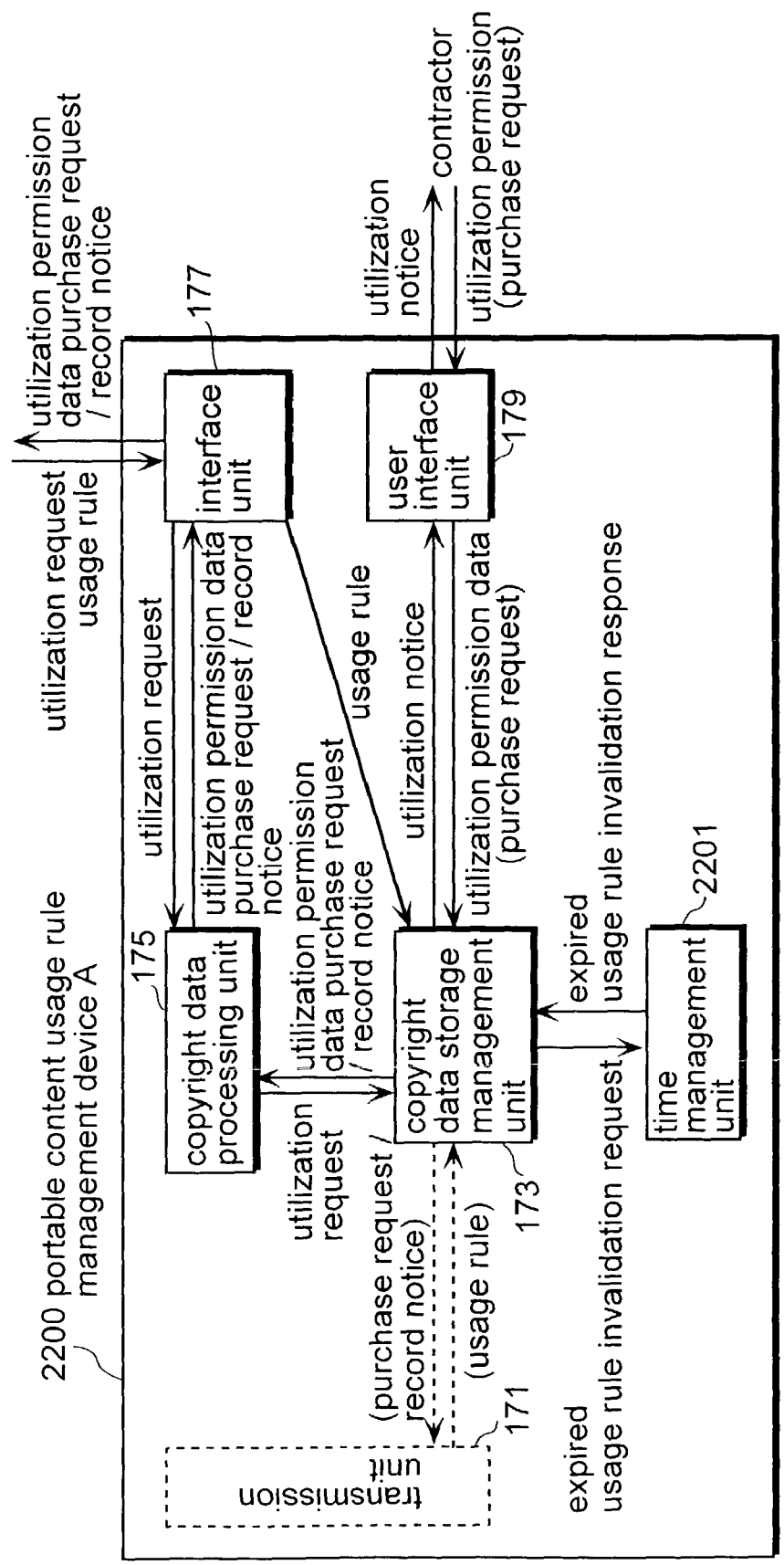
FIG. 22 is a block diagram that shows a configuration of a portable content usage rule management device A which has a time management unit.

In addition, when the portable content usage rule management device A is configured with a portable device such as a portable phone device which has a time clock unit, it is easy to control a time (expiration date) management for a usage rule without adding a unit. FIG. 22 is a block diagram that shows a configuration of a portable content usage rule management device A2200 which has a time management unit 2201. In the figure, the component element which already mentioned above is put the same reference number thus, the explanation is omitted. In addition, the figure shows a diagram of a portable content, usage rule management device A17 of FIG. 2 configured with the time management unit 2201. A dashed lines in the figure indicates a configuration element when the portable content usage rule administration device A17 includes the time administration unit 2201. As the FIG. 22, when the portable phone device is the portable content usage rule management unit 2200, the time management unit 2201 is included as a portable phone device original function inside the unit. The time management unit 2201 judges an expiration date, which is, attached to a usage rule and stored in the copyright data storage administration unit 173, that whether the expiration date is reached or not by comparing with a current time. When the usage rule expired is deleted or invalidated, above judgment, a deletion and an invalidation processing are carried out periodically or in specified time specified by a contractor.

Also, when the content usage rule management device is realized with a portable phone device, an accounting processing for the portable phone device and the content view are carried out in parallel. As a result, since two accounting processing are put together, it is more efficient than to manage each accountings separately.

Furthermore, when a user manages a device which carries around such as a portable phone, some annoying things such as misplacing the portable phone or stolen the portable phone will happen, unfortunately. As a measure for that case, it is desirable to preset an instruction for the portable phone device via interface unit that a content usage rule is not managed with the portable phone device itself.

In addition, the network 1 is not limited to be realized as the digital broadcast/GPS satellite network or a broadband network but as a home LAN or an intranet or a WAN.

Also, a details and a size of each parameter, which are a configuration elements for the descriptor of FIG. 16, FIG. 17, FIG. 18, FIG. 19 and FIG. 21, are just an example that there is no limitation for its details and the size for the invention.

In addition, there are other providing methods such as a method for providing a medium packaged with a content besides the method for providing the content via the network 1. A content and a content usage rule are corresponded each other with an identifier called "content ID" for specifying a content, however they can be managed separately. In FIG. 2, the explanation is made as one server, but the device for providing the content and the device for providing the content usage rule may well be a separate device. And the device can be set in either a neighborhood or a remote place on networks. In addition, as for providing a content itself, the other providing method is assumed such as, providing the content by broadcasts on airwave or by multicasts on communication. However this is not the thrust of the invention, an explanation for a contents provider and contents providing method is omitted.

What is claimed is:

1. A content usage rule management system comprising a user terminal that provides a content utilization for users and at least one content usage rule management device that stores a content usage rule for permitting a content utilization with the user terminal and manages the content utilization, wherein the user terminal includes:
a utilization unit that specifies a user who has logged in, and accepts a utilization request from the specified user, the utilization request indicating a request for a desired content utilization and including a usage rule and a content ID, the usage rule including an ID of a contractor of the content usage rule management device but not including a user ID of the user nor a key for decrypting an encrypted content desired by the user, and the content ID specifying the content desired by the user;
a storage unit in which a usage rule is stored, the usage rule including (i) a condition which includes utilization conditional data of a content, (ii) a key for decrypting the content which is encrypted, and (iii) the ID of the contractor, but not including the user ID of the user, and being available for the user of the user terminal; and
an interface unit that sends to the usage rule management device the user ID of the user and the utilization request via wireless communication in the case where the usage rule corresponding to the utilization request accepted by said utilization unit is not stored in said storage unit of the user terminal, the user ID being inputted when the user has logged in, and the utilization request including: the usage rule indicating utilization of the content desired by the user; and the content ID specifying the desired content, and
the content usage rule management device, which is a portable device, includes:
a sending and receiving unit that receives, from said interface unit of the user terminal, the user ID of the user other than the contractor and the utilization request via wireless communication, the utilization request including: the usage rule desired by the user, and the content ID specifying the content desired by the user;
a copyright data storage management unit in which the usage rule and contract related data are stored, the usage rule including (i) a condition which includes utilization conditional data of a content, (ii) a key for decrypting the content which is encrypted, and (iii) the ID of the contractor, but not including the user ID of the user and being obtained by the contractor of the content usage rule management device from a content-providing-rights holder, and the contract related data (i) being information created by the contractor of said content usage rule management device, (ii) including plural user IDs specifying the contractor and the user other than the contractor, and (iii) indicating whether or not the contractor permits the usage rule of the contractor to be utilized by the user who is other than the contractor and specified by a corresponding one of the plural user IDs;
a copyright data processing unit that (i) searches the copyright data storage management unit for the usage rule corresponding to the utilization request received (ii) checks whether or not the utilization of the search-out usage rule by the user is permitted, based on the user ID of the user and the contract related data (iii) creates, from the searched-out usage condition, in the case where the utilization of the usage rule is permitted, utilization permission data which includes a key for decrypting the content which is encrypted and (iv) creates, in the case where the utilization of the usage rule is not permitted, utilization permission data which does not include the key but includes a notice indicating that the utilization is not permitted; and
a notification and confirmation unit that provides the contractor with a notification that a utilization request has been received from the user terminal and that allows confirmation that the utilization permission data for use of the content is permitted,
wherein said sending and receiving unit also sends the created utilization permission data to the user terminal via wireless communication,
said interface unit receives the created utilization permission data and
said utilization unit decodes encrypted content using the key included with the created utilization permission data.

2. The content usage rule management system according to claim 1,
wherein the contract related data includes:
data defining whether or not the usage rule is to be shared by a group which includes the user having the user ID and a level of the user;
data defining a content utilizing restriction of the content, the data including a content ID of the content and details of the content restriction applied when the content is utilized; and
a level of the user corresponding to the content, the level being set by the contractor, and
said copyright data processing unit checks whether or not the utilization of the usage rule by the user is permitted or inquires to the contractor whether or not the utilization of the usage rule is to be permitted, based on (i) the user ID of the user, (ii) whether or not the usage rule is shared, (iii) a content, (iv) a level of the user, and (v) a level of the user being defined by the contract related data.

3. The content usage rule management system according to claim 1,
wherein said interface unit of the user terminal sends the utilization request to a plurality of content usage rule management devices which are portable devices and are in a wireless communicable range, and receives a plurality of utilization permission data items from the plurality of content usage rule management devices which have received the utilization request, the plurality of content usage rule management device including the content usage rule management device.

4. The content usage rule management system according to claim 2, wherein the copyright data processing unit judges whether or not the utilization of the content is permitted, based on comparison between a level which corresponds to an age of the user, and a level of the user which corresponds to the content and is set by the contractor, the age corresponding to the user ID of the user.

5. The content usage rule management system according to claim 2,
wherein the copyright data processing unit permits another user to utilize the content, based on the contract related data, the other user belonging to a same group as a group to which the user belongs, the group being specified by the user ID of the user.

6. The content usage rule management system according to claim 2,
wherein the copyright data processing unit extracts, from the user ID of the user and the content ID of the content, the details of the content restriction applied when the content is utilized, based on the contract related data, the content ID being included in the request for utilization of the content, and the details of the content restriction corresponding to the user.

7. A content usage rule management device in a content usage rule management system which includes a user terminal that provides a content utilization for users and a content usage rule management device that stores a content usage rule for permitting a content utilization with the user terminal and manages the content utilization, the content usage rule management device, which is a portable device, the content usage rule management device comprising:
a sending and receiving unit that receives, from an interface unit included in the user terminal, a user ID of a user and a utilization request via wireless communication, the utilization request including the usage rule and a content ID, the user ID of the user and the utilization request being inputted when the user has logged in, the usage rule including an ID of a contractor of the content usage rule management device but not including the user ID of the user other than the contractor or a key for decrypting an encrypted content desired by the user, and the content ID specifying the content desired by the user;
a copyright data storage management unit in which the usage rule and contract related data are stored, the usage rule including (i) a condition which includes utilization conditional data of a content, (ii) a key for decrypting a content which is encrypted, and (iii) the ID of the contractor, but not including the user ID of the user and being obtained by the contractor of the content usage rule management device from a content-providing-rights holder, and the contract related data (i) being information created by the contractor of the content usage rule management device, (ii) including plural user IDs specifying the contractor and a user other than the contractor, and (iii) indicating whether or not the contractor permits the usage rule of the contractor to be utilized by the user who is other than the contractor and specified by a corresponding one of the plural user IDs;
a copyright data processing unit that (i) searches the copyright data storage management unit for the usage rule corresponding to the utilization request received (ii) checks whether or not the utilization of the search-out usage rule by the user is permitted or inquire to the contractor whether or not the utilization of the searched-out usage rule is to be permitted, based on the user ID of the user and the contract related data (iii) creates, from the searched-out usage condition, in the case where the utilization of the usage rule is permitted, utilization permission data which includes a key for decrypting the content which is encrypted and (iv) creates, in the case where the utilization of the usage rule is not permitted, utilization permission data which does not include the key but includes a notice indicating that the utilization is not permitted; and
a notification and confirmation unit that provides the contractor with a notification that a utilization request has been received from the user terminal and that allows confirmation that the utilization permission data for use of the content is permitted,
wherein said sending and receiving unit also sends the created utilization permission data to the user terminal via wireless communication.

8. A content usage rule management method for use in a system which includes a user terminal that provides a content utilization for users and a content usage rule management device which is a portable device that stores a content usage rule for permitting a content utilization with the user terminal and manages the content utilization, the content usage rule management method comprising:
in the user terminal,
specifying a user who has logged in, and accepting a utilization request from the specified user, the utilization request indicating a request for a desired content utilization and including a usage rule and a content ID, the usage rule including an ID of a contractor of the content usage rule management device but not including a user ID of the user nor a key for decrypting an encrypted content desired by the user, and the content ID specifying the content desired by the user;
storing a usage rule which includes (i) a condition that includes utilization conditional data of a content, (ii) a key for decrypting the content which is encrypted, and (iii) the ID of the contractor, but not including the user ID of the user, and being available for the user of the user terminal; and
sending the user ID of the user and the utilization request via wireless communication in the case where the usage rule corresponding to the utilization request accepted is not stored, the user ID being inputted when the user has logged in, and the utilization request including: the usage rule indicating utilization of the content desired by the user; and the content ID specifying the desired content, and
in the content usage rule management device,
receiving, from the user terminal, the user ID of the user other than the contractor and the utilization request via wireless communication, the utilization request including: the usage rule desired by the user; and the content ID specifying the content desired by the user;
storing the usage rule and contract related data, the usage rule being obtained by the contractor of the content usage rule management device from a content-providing-rights holder, including a key for decrypting the encrypted content and the ID of the contractor, but not including the user ID of the user, and the contract related data (i) being information created by the contractor of the content usage rule management device, (ii) including plural user IDs specifying the contractor and the user other than the contractor, and (iii) indicating whether or not the contractor permits the usage rule of the contractor to be utilized by the user who is other than the contractor and specified by a corresponding one of the plural user IDs;

searching usage rules stored in said storing step for the usage rule corresponding to the utilization request received;

checking whether or not the utilization of the searched-out usage rule by the user is permitted, based on the user ID of the user and the contract related data;

creating, from the searched-out usage condition, in the case where the utilization of the usage rule is permitted, utilization permission data which includes a key for decrypting the content which is encrypted;

creating, in the case where the utilization of the usage rule is not permitted, utilization permission data which does not include the key but includes a notice indicating that the utilization is not permitted;

providing the contractor with a notification that a utilization request has been received from the user terminal and that allows confirmation that the utilization permission data for use of the content is permitted; and sending the created utilization permission data to the user terminal via wireless communication, wherein, in the user terminal, further comprising receiving the created utilization permission data; and encrypting content using the key included with the created utilization permission data.

9. The content usage rule management system according to claim 1, wherein the user terminal includes a plurality of the utilization units that provides a content utilization to a plurality of users in parallel, the copyright data processing unit inquires as to the content utilization availability to a plurality of the content usage rule management devices and obtains a plurality of the content utilization permission data, and each utilization unit provides the content utilization in parallel based on the plurality of the content utilization permission data received from the plurality of the content usage rule management devices.

10. The content usage rule management system according to claim 9, wherein the interface unit in the content usage rule management device, when the contractor permits a content utilization to another content user, accepts a setup input of a priority for each of the users for permitting the content utilization from the contractor, and the copyright data processing unit creates the content utilization permission data based on the priority order.

* * * * *